(12) United States Patent
Rico Alvarino et al.

(10) Patent No.: US 12,341,605 B2
(45) Date of Patent: *Jun. 24, 2025

(54) MULTIMEDIA BROADCAST MULTICAST SERVICES WITH NEW NUMEROLOGIES AND REFERENCE SIGNAL PATTERNS

(71) Applicant: QUALCOMM Incorporated, San Diego, CA (US)

(72) Inventors: Alberto Rico Alvarino, San Diego, CA (US); Ayan Sengupta, San Diego, CA (US); Amer Catovic, San Diego, CA (US); Le Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 17/740,020

(22) Filed: May 9, 2022

(65) Prior Publication Data

US 2022/0271860 A1    Aug. 25, 2022

Related U.S. Application Data

(63) Continuation of application No. 16/710,429, filed on Dec. 11, 2019, now Pat. No. 11,329,756.
(Continued)

(51) Int. Cl.
*H04L 1/00* (2006.01)
*H04L 1/1607* (2023.01)
(Continued)

(52) U.S. Cl.
CPC .......... *H04L 1/0016* (2013.01); *H04L 1/0005* (2013.01); *H04L 1/1642* (2013.01);
(Continued)

(58) Field of Classification Search
CPC . H04L 1/0005; H04L 1/1642; H04L 27/2607; H04L 27/2613; H04L 5/0051;
(Continued)

(56) References Cited

U.S. PATENT DOCUMENTS 10,075,516 B2    9/2018    Qi et al.
11,329,756 B2    5/2022    Rico Alvarino et al.
(Continued)

FOREIGN PATENT DOCUMENTS

EP    3429291 A1    1/2019
WO    WO-2017164222 A1    9/2017
(Continued)

OTHER PUBLICATIONS

3GPP TS36.331 V15.3.0 (Sep. 2018) (Year: 2018).*
(Continued)

*Primary Examiner* — Sharmin Chowdhury
(74) *Attorney, Agent, or Firm* — Holland & Hart LLP

(57) ABSTRACT

Methods, systems, and devices for wireless communications are described. A user equipment (UE) may receive broadcast information from a base station indicating a numerology or a reference signal (RS) pattern to be used in broadcast or multicast transmissions (e.g., a physical multicast channel (PMCH)). The UE may identify a modulation and coding scheme (MCS) associated with the broadcast or multicast transmission and may determine a transport block size (TBS) based on the MCS and at least one of the numerology or the RS pattern. For instance, a UE may determine TBS for numerologies associated with a single symbol that spans multiple subframes differently from that of other numerologies. Additionally or alternatively, a UE may determine TBS for sparse RS patterns differently from that of other RS
(Continued)

patterns. The UE may then perform communication with the base station via the broadcast or multicast transmissions in accordance with the TBS.

30 Claims, 21 Drawing Sheets

Related U.S. Application Data

(60) Provisional application No. 62/778,780, filed on Dec. 12, 2018.

(51) Int. Cl.
  *H04L 5/00* (2006.01)
  *H04L 27/26* (2006.01)
  *H04W 4/06* (2009.01)

(52) U.S. Cl.
  CPC .......... *H04L 5/0048* (2013.01); *H04L 5/0051* (2013.01); *H04L 27/26025* (2021.01); *H04L 27/2607* (2013.01); *H04L 27/261* (2013.01); *H04L 27/2613* (2013.01); *H04W 4/06* (2013.01)

(58) Field of Classification Search
  CPC ............. H04L 27/26025; H04L 1/0023; H04L 1/0016; H04L 2001/0093; H04L 27/261; H04L 5/0064; H04L 5/0091; H04L 5/0048; H04L 5/0007; H04W 4/06
  See application file for complete search history.

(56) References Cited

U.S. PATENT DOCUMENTS

| | | |
|---|---|---|
| 2016/0013897 A1 | 1/2016 | Sun et al. |
| 2017/0048820 A1* | 2/2017 | Wang .................... H04L 5/0048 |
| 2017/0288888 A1 | 10/2017 | Rico Alvarino et al. |
| 2018/0092106 A1 | 3/2018 | Rico Alvarino et al. |
| 2019/0090218 A1* | 3/2019 | Noh ..................... H04L 5/0032 |
| 2019/0165894 A1 | 5/2019 | Choi et al. |
| 2019/0349976 A1 | 11/2019 | Rudolf |
| 2020/0244285 A1 | 7/2020 | Kim et al. |
| 2020/0274635 A1 | 8/2020 | Chen et al. |
| 2020/0322925 A1 | 10/2020 | Takeda et al. |
| 2020/0403748 A1 | 12/2020 | Yokomakura |
| 2021/0211232 A1 | 7/2021 | Hwang et al. |

FOREIGN PATENT DOCUMENTS

| | | |
|---|---|---|
| WO | WO-2018021881 A1 | 2/2018 |
| WO | WO-2018031718 A1 | 2/2018 |

OTHER PUBLICATIONS

3GPP Ts 36.331: "3rd Generation Partnership Project; Technical Specification Group Radio Access Network; Evolved Universal Terrestrial Radio Access (E-UTRA); Radio Resource Control (RRC); Protocol specification (Release 14)", V14.8.0 (Sep. 2018), 773 p. 2018.
International Preliminary Report on Patentability—PCT/US2019/066042, The International Bureau of WIPO—Geneva, Switzerland, Jun. 24, 2021.
International Search Report and Written Opinion—PCT/US2019/066042—ISA/EPO—Apr. 21, 2020.

* cited by examiner

MULTIMEDIA BROADCAST MULTICAST SERVICES WITH NEW NUMEROLOGIES AND REFERENCE SIGNAL PATTERNS

CROSS REFERENCE

The present application for Patent is a Continuation of U.S. patent application Ser. No. 16/710,429 by RICO ALVARINO, et al, entitled, "MULTIMEDIA BROADCAST MULTICAST SERVICES WITH NEW NUMEROLOGIES AND REFERENCE SIGNAL PATTERNS" filed Dec. 11, 2019, which claims the benefit of U.S. Provisional Patent Application No. 62/778,780 by RICO ALVARINO et al., entitled "MULTIMEDIA BROADCAST MULTICAST SERVICES WITH NEW NUMEROLOGIES AND REFERENCE SIGNAL PATTERNS," filed Dec. 12, 2018, assigned to the assignee hereof, and expressly incorporated by reference in its entirety herein.

BACKGROUND

The following relates generally to wireless communications, and more specifically to multimedia broadcast multicast services (MBMS) with new numerologies and reference signal (RS) patterns.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may receive a system information block (SIB) from a base station indicating information related to a physical multicast channel (PMCH) transmission. Such information may include a modulation and coding scheme (MCS), which the UE may use in conjunction with a physical downlink shared channel (PDSCH) MCS table to determine a modulation scheme and/or transport block size (TB S) for the upcoming PMCH transmission. However, the overhead for PMCH may be different from the overhead for PDSCH, meaning that the PDSCH MCS table may not always provide an optimal mapping from MCS to TBS. Further, current techniques of determining TBS may not properly account for numerologies where single orthogonal frequency division multiplexing (OFDM) symbols span multiple subframes or sparse RS patterns.

SUMMARY

The described techniques relate to improved methods, systems, devices, and apparatuses that support multimedia broadcast multicast services (MBMS) with new numerologies and reference signal (RS) patterns. Generally, the described techniques provide for a user equipment (UE) to receive broadcast information from a base station indicating a numerology or a RS pattern to be used in broadcast or multicast transmissions (e.g., a physical multicast channel (PMCH)); identify a modulation and coding scheme (MCS) associated with the broadcast or multicast transmission; determine a transport block size (TBS) based on the MCS and at least one of the numerology or the RS pattern; and perform communication with the base station via the broadcast or multicast transmissions in accordance with the TBS.

A method of wireless communications at a UE is described. The method may include receiving, from a base station, broadcast information indicating one or more of a numerology or a RS pattern to be used in broadcast or multicast transmissions, identifying an MCS associated with the broadcast or multicast transmissions, determining a TBS based at least on the MCS and at least one of the numerology or the RS pattern, and communicating via the broadcast or multicast transmissions in accordance with the TBS.

An apparatus for wireless communications at a UE is described. The apparatus may include a processor, memory coupled with the processor, and instructions stored in the memory. The instructions may be executable by the processor to cause the apparatus to receive, from a base station, broadcast information indicating one or more of a numerology or a RS pattern to be used in broadcast or multicast transmissions, identify an MCS associated with the broadcast or multicast transmissions, determine a TBS based at least on the MCS and at least one of the numerology or the RS pattern, and communicate via the broadcast or multicast transmissions in accordance with the TBS.

Another apparatus for wireless communications at a UE is described. The apparatus may include means for receiving, from a base station, broadcast information indicating one or more of a numerology or a RS pattern to be used in broadcast or multicast transmissions, identifying an MCS associated with the broadcast or multicast transmissions, determining a TBS based at least on the MCS and at least one of the numerology or the RS pattern, and communicating via the broadcast or multicast transmissions in accordance with the TBS.

A non-transitory computer-readable medium storing code for wireless communications at a UE is described. The code may include instructions executable by a processor to receive, from a base station, broadcast information indicating one or more of a numerology or a RS pattern to be used in broadcast or multicast transmissions, identify an MCS associated with the broadcast or multicast transmissions, determine a TBS based at least on the MCS and at least one of the numerology or the RS pattern, and communicate via the broadcast or multicast transmissions in accordance with the TBS.

In some examples of the method, apparatuses, and non-transitory computer-readable medium described herein, identifying the MCS may include operations, features, means, or instructions for receiving an indication of one of a set of MCS tables which the UE may reference in determining the MCS.

In some examples of the method, apparatuses, and non-transitory computer-readable medium described herein, identifying the MCS may include operations, features, means, or instructions for identifying an MCS table based on at least one of the numerology or the RS pattern.

In some examples of the method, apparatuses, and non-transitory computer-readable medium described herein, identifying the MCS may include operations, features, means, or instructions for referencing an MCS table that accounts for each of a set of numerologies or RS patterns that could be signaled to the UE.

In some examples of the method, apparatuses, and non-transitory computer-readable medium described herein, at least one of the set of numerologies accounted for by the MCS table includes a same number of symbols and a different number of subchannels as another of the set of numerologies accounted for by the MCS table.

In some examples of the method, apparatuses, and non-transitory computer-readable medium described herein, determining the TBS may include operations, features, means, or instructions for identifying a symbol duration based on the numerology, and determining the TBS based on the symbol duration.

In some examples of the method, apparatuses, and non-transitory computer-readable medium described herein, determining the TBS may include operations, features, means, or instructions for identifying, for the numerology, that a resource block may have a bandwidth that may be less than and divisible evenly into 180 kilohertz (kHz), and determining the TBS based on a number of resource blocks within a slot of the broadcast or multicast transmissions.

In some examples of the method, apparatuses, and non-transitory computer-readable medium described herein, determining the TBS may include operations, features, means, or instructions for identifying a number of resource blocks within a slot of the broadcast or multicast transmissions, scaling the number of resource blocks within the slot based on the numerology, and determining the TBS based on the scaled number of resource blocks within the slot.

In some examples of the method, apparatuses, and non-transitory computer-readable medium described herein, the TBS may be based on a reference number of spatial layers, where the reference number of spatial layers may be identified based on the numerology.

In some examples of the method, apparatuses, and non-transitory computer-readable medium described herein, determining the number of TBs may include operations, features, means, or instructions for identifying, based on the numerology, that multiple TBs may be to be mapped to a single slot of the broadcast or multicast transmissions.

In some examples of the method, apparatuses, and non-transitory computer-readable medium described herein, determining the TBS may include operations, features, means, or instructions for determining an initial TBS based on a number of resource blocks within a slot of the broadcast or multicast transmissions, scaling the initial TBS using a scaling factor based on the numerology, and determining the TBS from a set of available TBSs based on the scaled initial TBS.

In some examples of the method, apparatuses, and non-transitory computer-readable medium described herein, the determined TBS may be a closest TBS to the scaled initial TBS in the set of available TBSs.

In some examples of the method, apparatuses, and non-transitory computer-readable medium described herein, identifying the MCS may include operations, features, means, or instructions for determining the set of MCSs based on a density of RSs within a slot of the broadcast or multicast transmissions and upon the multiple indications.

In some examples of the method, apparatuses, and non-transitory computer-readable medium described herein, identifying the set of MCSs may include operations, features, means, or instructions for receiving, from the base station, multiple indications corresponding to the set of MCSs.

In some examples of the method, apparatuses, and non-transitory computer-readable medium described herein, identifying the set of MCSs may include operations, features, means, or instructions for receiving, from the base station, an indication of a single MCS, and determining, based on the single MCS, the set of MCSs.

Some examples of the method, apparatuses, and non-transitory computer-readable medium described herein may further include operations, features, means, or instructions for receiving both the numerology and the RS pattern as part of the broadcast information.

In some examples of the method, apparatuses, and non-transitory computer-readable medium described herein, the numerology and the RS pattern may be jointly encoded.

Some examples of the method, apparatuses, and non-transitory computer-readable medium described herein may further include operations, features, means, or instructions for transmitting, to the base station, UE capability information pertaining to scaling values supportable by the UE associated with RS patterns available to be signaled for use with the broadcast or multicast transmissions.

Some examples of the method, apparatuses, and non-transitory computer-readable medium described herein may further include operations, features, means, or instructions for receiving a MBMS transmission from the base station, where the MBMS includes one of the RS patterns available to be signaled, and transmitting, to a second base station, MBMS assistance information including at least the RS pattern included by the MBMS.

Some examples of the method, apparatuses, and non-transitory computer-readable medium described herein may further include operations, features, means, or instructions for receiving one or more transmissions from the second base station over a set of components carriers, where a total number of the set of component carriers may be limited based on the scaling values supported by the UE.

In some examples of the method, apparatuses, and non-transitory computer-readable medium described herein, transmitting the UE capability information may include operations, features, means, or instructions for transmitting the UE capability information with a MBMS interest indication.

In some examples of the method, apparatuses, and non-transitory computer-readable medium described herein, the broadcast or multicast transmissions are mapped to a physical multicast channel according to a numerology-specific mapping.

In some examples of the method, apparatuses, and non-transitory computer-readable medium described herein, the numerology-specific mapping includes a symbol-level interleaving of the broadcast or multicast transmissions.

In some examples of the method, apparatuses, and non-transitory computer-readable medium described herein, the numerology-specific mapping may be also based on at least one of the TBS, the MCS, a bandwidth to be used for the broadcast or multicast transmissions, or a number of codeblocks to be included in the broadcast or multicast transmissions.

In some examples of the method, apparatuses, and non-transitory computer-readable medium described herein, mapping the broadcast or multicast transmissions to the physical multicast channel according to the numerology-specific mapping may include operations, features, means, or instructions for mapping first to a virtual resource block, and mapping from the virtual resource block to a physical resource block, where the mapping from the virtual resource block to the physical resource block may be numerology-specific.

Some examples of the method, apparatuses, and non-transitory computer-readable medium described herein may further include operations, features, means, or instructions for receiving an indication specifying a periodicity of a physical multicast channel to be used for the broadcast or multicast transmissions, and determining a symbol duration from the indication specifying the periodicity based on the numerology.

In some examples of the method, apparatuses, and non-transitory computer-readable medium described herein, the indication specifying the periodicity may be associated with a number of subframes and may include operations, features, means, or instructions for identifying a number of subframes to be used for the physical multicast channel based on the indication and the numerology.

In some examples of the method, apparatuses, and non-transitory computer-readable medium described herein, the indication specifying the periodicity may be associated with a number of slots and may include operations, features, means, or instructions for identifying the number of slots to be used for the physical multicast channel based at least in part on the indication and the numerology.

A method of wireless communications at a base station is described. The method may include transmitting, to a UE, broadcast information indicating one or more of a numerology or a RS pattern to be used in broadcast or multicast transmissions, identifying an MCS associated with the broadcast or multicast transmissions, determining a TBS based at least on the MCS and at least one of the numerology or the RS pattern, transmitting, to the UE, one or more indications corresponding to one or more MCSs associated with the broadcast or multicast transmissions, and communicating via the broadcast or multicast transmissions in accordance with the TBS.

An apparatus for wireless communications at a base station is described. The apparatus may include a processor, memory coupled with the processor, and instructions stored in the memory. The instructions may be executable by the processor to cause the apparatus to transmit, to a UE, broadcast information indicating one or more of a numerology or a RS pattern to be used in broadcast or multicast transmissions, identify an MCS associated with the broadcast or multicast transmissions, determine a TBS based at least on the MCS and at least one of the numerology or the RS pattern, and communicate via the broadcast or multicast transmissions in accordance with the TBS.

Another apparatus for wireless communications at a base station is described. The apparatus may include means for transmitting, to a UE, broadcast information indicating one or more of a numerology or a RS pattern to be used in broadcast or multicast transmissions, identifying an MCS associated with the broadcast or multicast transmissions, determining a TBS based at least on the MCS and at least one of the numerology or the RS pattern, transmitting, to the UE, one or more indications corresponding to one or more MCSs associated with the broadcast or multicast transmissions, and communicating via the broadcast or multicast transmissions in accordance with the TBS.

A non-transitory computer-readable medium storing code for wireless communications at a base station is described. The code may include instructions executable by a processor to transmit, to a UE, broadcast information indicating one or more of a numerology or a RS pattern to be used in broadcast or multicast transmissions, identify an MCS associated with the broadcast or multicast transmissions, determine a TBS based at least on the MCS and at least one of the numerology or the RS pattern, and communicate via the broadcast or multicast transmissions in accordance with the TBS.

Some examples of the method, apparatuses, and non-transitory computer-readable medium described herein may further include operations, features, means, or instructions for transmitting, to the UE, an indication of one of a set of MCS tables based on the numerology.

In some examples of the method, apparatuses, and non-transitory computer-readable medium described herein, identifying the MCS may include operations, features, means, or instructions for identifying an MCS table based on at least one of the numerology or the RS pattern and signaling, to the UE, the identified MCS table.

In some examples of the method, apparatuses, and non-transitory computer-readable medium described herein, identifying the MCS may include operations, features, means, or instructions for referencing an MCS table that accounts for each of a set of numerologies or RS patterns that could be signaled to the UE.

In some examples of the method, apparatuses, and non-transitory computer-readable medium described herein, at least one of the set of numerologies accounted for by the MCS table includes a same number of symbols and a different number of subchannels as another of the set of numerologies accounted for by the MCS table.

In some examples of the method, apparatuses, and non-transitory computer-readable medium described herein, determining the TBS may include operations, features, means, or instructions for identifying a symbol duration based on the numerology, and determining the TBS based on the symbol duration.

In some examples of the method, apparatuses, and non-transitory computer-readable medium described herein, determining the TBS may include operations, features, means, or instructions for identifying, for the numerology, that a resource block may have a bandwidth that may be less than and divisible evenly into 180 kHz, and determining the TBS based on a number of resource blocks within a slot of the broadcast or multicast transmissions.

In some examples of the method, apparatuses, and non-transitory computer-readable medium described herein, determining the TBS may include operations, features, means, or instructions for identifying a number of resource blocks within a slot of the broadcast or multicast transmissions, scaling the number of resource blocks within the slot based on the numerology, and determining the TBS based on the scaled number of resource blocks within the slot.

In some examples of the method, apparatuses, and non-transitory computer-readable medium described herein, the TBS may be based on a reference number of spatial layers, where the reference number of spatial layers may be identified based on the numerology.

In some examples of the method, apparatuses, and non-transitory computer-readable medium described herein, determining the number of TBs may include operations, features, means, or instructions for identifying, based on the numerology, that multiple TBs may be to be mapped to a single slot of the broadcast or multicast transmissions.

In some examples of the method, apparatuses, and non-transitory computer-readable medium described herein, determining the TBS may include operations, features, means, or instructions for determining an initial TBS based on a number of resource blocks within a slot of the broadcast or multicast transmissions, scaling the initial TBS using a scaling factor based on the numerology, and determining the TBS from a set of available TBSs based on the scaled initial TBS.

In some examples of the method, apparatuses, and non-transitory computer-readable medium described herein, the determined TBS may be a closest TBS to the scaled initial TBS in the set of available TBSs.

In some examples of the method, apparatuses, and non-transitory computer-readable medium described herein, identifying the MCS may include operations, features, means, or instructions for receiving an indication of a single MCS from the base station, and determining a set of MCSs based on a density of RSs within a slot of the broadcast or multicast transmissions and upon the single MCS.

In some examples of the method, apparatuses, and non-transitory computer-readable medium described herein, identifying the MCS may include operations, features, means, or instructions for receiving multiple indications corresponding to a set of MCSs from the base station, and determining the set of MCSs based on a density of RSs within a slot of the broadcast or multicast transmissions and upon the multiple indications.

Some examples of the method, apparatuses, and non-transitory computer-readable medium described herein may further include operations, features, means, or instructions for transmitting both the numerology and the RS pattern as part of the broadcast information.

In some examples of the method, apparatuses, and non-transitory computer-readable medium described herein, the numerology and the RS pattern may be jointly encoded.

Some examples of the method, apparatuses, and non-transitory computer-readable medium described herein may further include operations, features, means, or instructions for receiving, from the UE, UE capability information pertaining to scaling values supportable by the UE associated with RS patterns available to be signaled for use with the broadcast or multicast transmissions.

Some examples of the method, apparatuses, and non-transitory computer-readable medium described herein may further include operations, features, means, or instructions for transmitting a MBMS transmission from the base station, where the MBMS includes one of the RS patterns available to be signaled.

In some examples of the method, apparatuses, and non-transitory computer-readable medium described herein, receiving the UE capability information may include operations, features, means, or instructions for receiving the UE capability information with a MBMS interest indication.

In some examples of the method, apparatuses, and non-transitory computer-readable medium described herein, the broadcast or multicast transmissions may be mapped to a physical multicast channel according to a numerology-specific mapping.

In some examples of the method, apparatuses, and non-transitory computer-readable medium described herein, the numerology-specific mapping includes a symbol-level interleaving of the broadcast or multicast transmissions.

In some examples of the method, apparatuses, and non-transitory computer-readable medium described herein, the numerology-specific mapping may be also based on at least one of the TBS, the MCS, a bandwidth to be used for the broadcast or multicast transmissions, or a number of code-blocks to be included in the broadcast or multicast transmissions.

In some examples of the method, apparatuses, and non-transitory computer-readable medium described herein, mapping the broadcast or multicast transmissions to the physical multicast channel according to the numerology-specific mapping may include operations, features, means, or instructions for mapping first to a virtual resource block, and mapping from the virtual resource block to a physical resource block, where the mapping from the virtual resource block to the physical resource block may be numerology-specific.

Some examples of the method, apparatuses, and non-transitory computer-readable medium described herein may further include operations, features, means, or instructions for transmitting an indication specifying a periodicity of a physical multicast channel to be used for the broadcast or multicast transmissions.

In some examples of the method, apparatuses, and non-transitory computer-readable medium described herein, the indication specifies the periodicity in terms of a number of slots.

DETAILED DESCRIPTION

Figure 1:
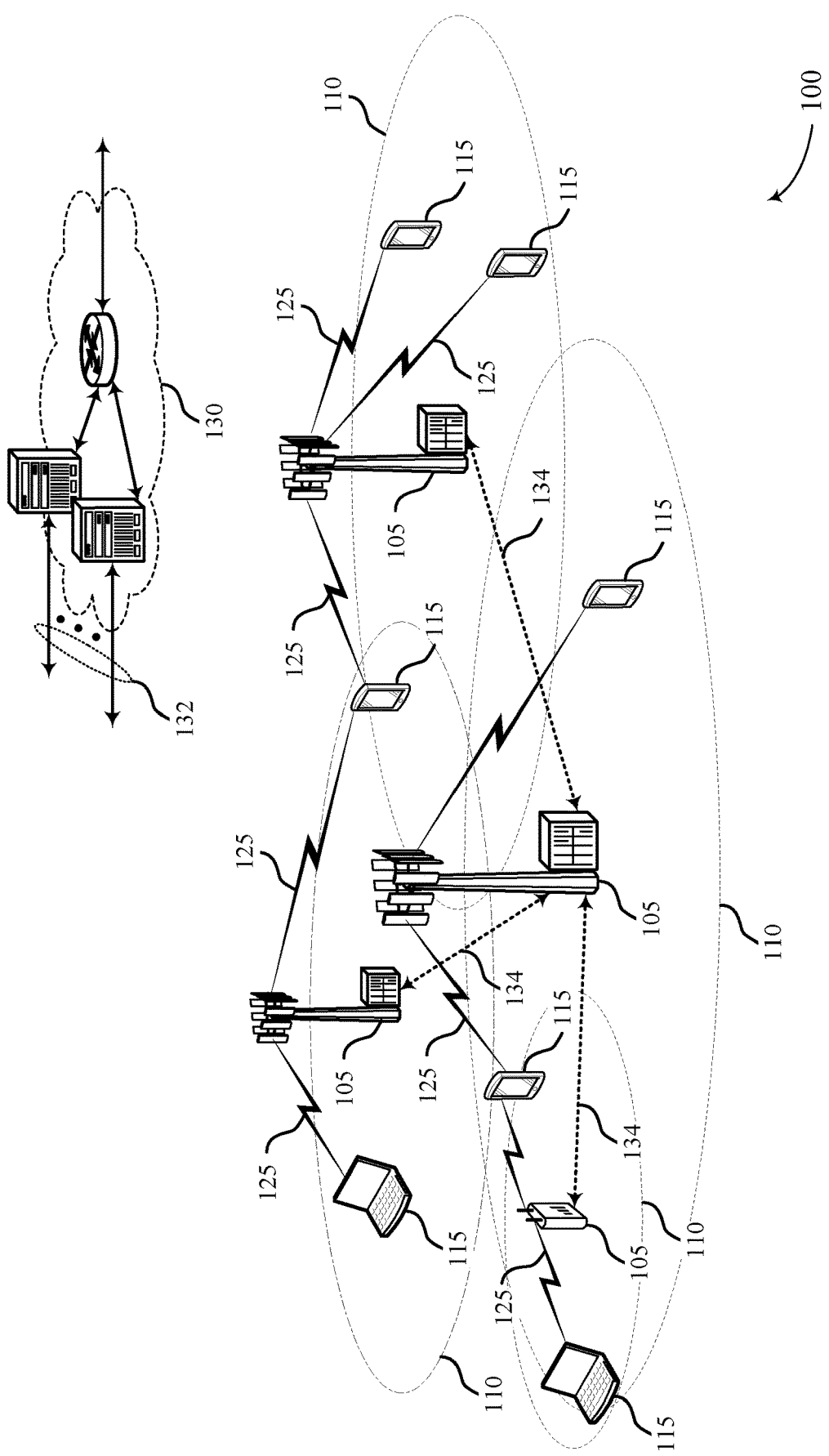
FIG. 1 illustrates an example of a wireless communications system that supports multimedia broadcast multicast services (MBMS) with new numerologies and reference signal (RS) patterns in accordance with aspects of the present disclosure.

In some cases, a user equipment (UE) may receive broadcast information (e.g., via a system information block (SIB)) from a base station. If the UE determines to receive a physical multicast channel (PMCH) transmission and the broadcast information includes information related to PMCH transmissions, the UE may use a modulation and coding scheme (MCS) indicated by the SIB (e.g., via a PMCH-Config field) to determine a modulation scheme and/or transport block (TB) size (TB S) associated with the PMCH transmission.

One way a UE may determine the TBS is via a preconfigured physical downlink shared channel (PDSCH) MCS table. The overhead (e.g., an amount of a channel unavailable for data transmission) for PDSCHs may be different from the overhead for PMCHs. As such, PDSCH MCS tables may enable nonoptimal mappings from MCS to TBS and/or modulation scheme (or, in some cases, between TBS and modulation scheme). One alternative is to define and utilize distinct MCS tables for PMCHs which may be indicated by base station signaling or determined by a UE based on numerology and/or reference signal (RS) pattern information. Additionally or alternatively, the UE may utilize a 6-bit table, which may have more flexibility than conventional PDSCH MCS tables.

In some cases, PDSCH MCS tables and/or techniques of determining TBS may fail to properly account for numerologies that have an orthogonal frequency division multiplexing (OFDM) symbol spanning multiple subframes. Such techniques of determining TBS may assume that OFDM symbols of all numerologies will fit completely within a single subframe and will be evenly divisible within the subframe. However, some numerologies may have OFDM symbols that span a greater length than that of the subframe. Additionally or alternatively, such techniques for determining TBS may assume that a physical resource block (PRB) has a fixed width in the frequency domain (e.g., 180 kilohertz (kHz)), regardless of numerology. Techniques that may account for numerologies with OFDM symbols that span a greater length than that of a subframe may include defining PRB width on a per-numerology basis for at least some numerologies; defining PRB width as the same for all numerologies but scaling the number of PRBs for at least some numerologies; introducing a reference layer factor that corresponds to a number of layers that and determining TBS as though TBS is mapped to that number of layers; mapping multiple TBs to one OFDM symbol for at least some numerologies; and initially determining TBS the same way for all numerologies but scaling TBS for at least some of the numerologies.

Additionally or alternatively, certain techniques of determining TBS may fail to properly account for the density or sparsity of RS patterns in the time domain. For instance, some symbols and/or slots may have a low number of RSs or no RSs at all and other symbols and/or slots may have a higher number of RSs. The overhead may be different between symbols and/or slots with different numbers of RSs (e.g., symbols and/or slots with no RS patterns vs. symbol and/or slots with RS patterns). Such techniques may not account for this sparsity in time. One alternative is for a base station to signal multiple MCS entries (e.g., via SIB) for different types of symbols, slots, subframes, or a combination. Additionally or alternatively, a base station may signal a single MCS entry (e.g., via SIB) from which a UE may derive multiple TBS and/or modulation schemes for different symbols, slots, subframes, or a combination based on a function. In some cases, both numerology and new RS patterns may be signaled together and may be done on a per multicast-broadcast single frequency network (MBSFN) area basis.

In some cases, increasing the sparsity of RS patterns and slot length may increase UE complexity. Sparser RS patterns may enable RSs to be in later slots and increasing slot length may increase a duration of time that an RS is transmitted. UE complexity may increase in such cases because a UE may perform buffering (e.g., of one or multiple slots) until an entire RS is received, which may be a longer time in numerologies with longer slot lengths and at a later time in subframes with more sparse RS patterns. As such, the number of simultaneous carriers and/or bandwidth the UE receives may depend on the RS pattern. In such cases, reporting capabilities may be enhanced to include scaling values for the RS pattern. Additionally or alternatively, a multimedia broadcast multicast service (MBMS) interest indication may also include the RS pattern that the service used.

In some cases, a TB associated with a PMCH may be transformed into a codeword and may be mapped to a position in the frequency domain. A codeword may include one or more codeblocks (e.g., portions of bits that are independently encoded). Under frequency-first mapping, codeblocks may be mapped to consecutive positions in the frequency domain. Such consecutive mapping, however, may result in poor frequency diversity in cases where multiple codeblocks are transmitted, especially as subcarrier spacing decreases. One alternative is to apply different mapping and/or to pre-apply an interleaver to PMCH based on the numerology associated with the PMCH. Applying a different mapping and/or pre-applying an interleaver may, additionally or alternatively, depend on TBS, MCS, bandwidth, a number of codeblocks, or a combination. Additionally or alternatively, virtual resource block (VRB) to PRB mapping may be utilized.

In some cases, a PMCH may occur with a certain periodicity (e.g., a PMCH may occur once every number of subframes). In such cases, a base station may indicate a subframe within the period within which a PMCH may be fully contained. However (e.g., when a numerology has OFDM symbols spanning multiple subframes), the PMCH may span multiple subframes depending on the numerology. To account for multiple subframes, a UE may determine, based on the numerology of the PMCH transmission, that the PMCH is to span multiple subframes and may assume that the PMCH will be sent over the indicated subframe as well as one or more subframes following immediately after and/or before the indicated subframe. Additionally or alternatively, the base station may adjust its signaling to refer to a slot, rather than a subframe, when the PMCH will be sent, which the UE may use in conjunction with numerology information to determine when the UE may receive the PMCH.

Aspects of the disclosure are initially described in the context of a wireless communications system. Aspects of the disclosure are further illustrated by and described with reference to an additional wireless communications system, a numerology comparison, a TBS determination process, and a process flow. Aspects of the disclosure are further illustrated by and described with reference to apparatus diagrams, system diagrams, and flowcharts that relate to MBMS with new numerologies and RS patterns.

FIG. 1 illustrates an example of a wireless communications system 100 that supports MBMS with new numerologies and RS patterns in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID) or a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with one component carrier (CC) or more operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, RSs, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, RSs, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $Tf=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or set of a single resource block (RB) or multiple RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support efficient techniques for enabling MBMS with new numerologies and RS patterns. For instance, a UE 115 may receive broadcast information from a base station 105 indicating a numerology or a RS pattern to be used in broadcast or multicast transmissions (e.g., a PMCH). The UE 115 may identify an MCS associated with the broadcast or multicast transmission and may determine a TBS based on the MCS and at least one of the numerology or the RS pattern. For instance, a UE 115 may determine TBS for numerologies associated with a single symbol that spans multiple subframes differently from that of other numerologies. Additionally or alternatively, a UE 115 may determine TBS for sparse RS patterns differently from that of other RS patterns. The UE 115 may then perform communication with the base station 105 via the broadcast or multicast transmissions in accordance with the TBS.

Figure 2:
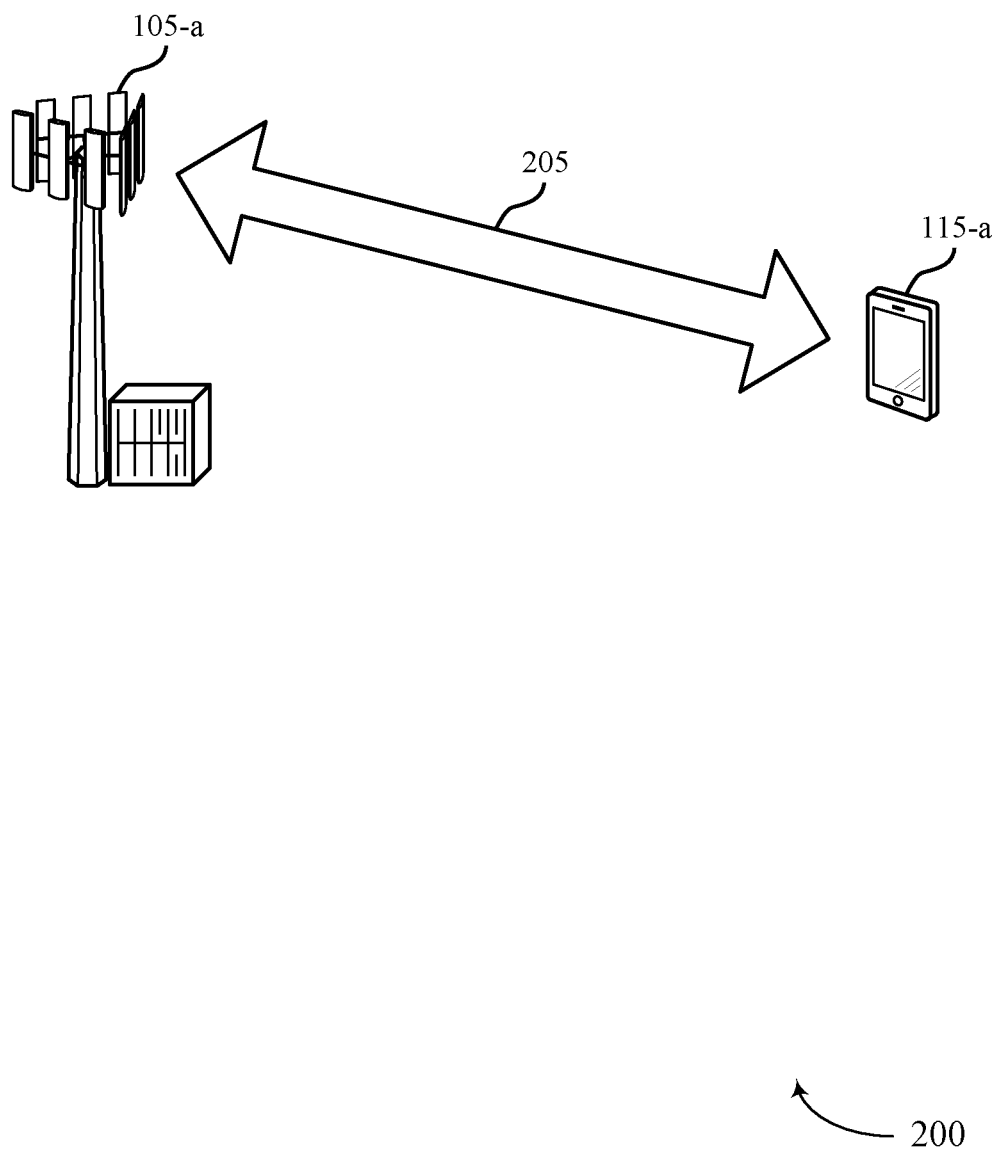
FIG. 2 illustrates an example of a wireless communications system that supports MBMS with new numerologies and RS patterns in accordance with aspects of the present disclosure.

FIG. 2 illustrates an example of a wireless communications system 200 that supports MBMS with new numerologies and reference signal patterns in accordance with aspects of the present disclosure. In some examples, wireless communications system 200 may implement aspects of wireless communications system 100. For instance, wireless communications system 200 may include base station 105-a and UE 115-a, which may be examples of a base station 105 and UE 115 as described with wireless communications system 100.

Base station 105-a may communicate with UE 115-a over a communication link 205. Such communications may, for instance, include one or more PMCH transmissions from base station 105-a to UE 115-a. Each PMCH transmission may be transmitted via one or more TBs, where each TB spans one slot and/or symbol. In some cases, a slot may refer to a time unit over which a single TB is mapped. As such, in certain numerologies, a slot may span less than or equal to a single subframe and, in other numerologies, a slot may span more than the single subframe. In some cases, the subframe may be a MBSFN subframe. Each numerology may be associated with a respective cyclic prefix (CP) which may be proportional to slot length. For instance, a first numerology may be associated with a 100 microsecond (us) CP and have an OFDM symbol spanning half of a subframe (e.g., 0.5 ms); a second numerology may be associated with a 200 us CP and have an OFDM symbol spanning an entire subframe (e.g., 1 ms); a third numerology may be associated with a 300 us CP and have an OFDM symbol spanning one and a half subframes (e.g., 1.5 ms); a fourth numerology may be associated with a 400 us CP and have an OFDM symbol spanning two subframes (e.g., 2 ms); and a fifth numerology may be associated with a 600 us CP and may have OFDM symbols spanning three subframes (e.g., 3 ms). 400 us CP may be associated with a 625 Hz subcarrier spacing and 600 us CP may be associated with a 416.67 Hz subcarrier spacing. Larger or smaller CPs are possible without deviating from the scope of the present disclosure.

Base station 105-a may provide scheduling information about PMCH transmissions within a SIB. UE 115-a may receive the SIB, extract an MCS for the PMCH from the SIB (e.g., via a PMCH-Config field), and determine a TBS and/or modulation scheme based on the MCS. Additionally, UE 115-a may compute the bandwidth of the cell of base station 105-a (e.g., PMCH may use the whole bandwidth allocation). In some cases, UE 115-a may be preconfigured with one or more MCS tables specific to PMCH. UE 115-a may determine whether to use a PDSCH MCS table or a PMCH MCS table based on whether UE 115-a is using a PDSCH MCS or a PMCH MCS. In one example, base station 105-a may explicitly signal (e.g., via the SIB) which PMCH MCS table is to be used. Additionally or alternatively, UE 115-a may determine which PMCH MCS table to use based on numerology and/or RS pattern information (e.g., numerology or RS pattern information received in the SIB). In other cases, UE 115-a may utilize a 6-bit (or higher) table which has more flexibility (e.g., more MCS to TB mapping options) than conventional PDSCH MCS tables.

In some cases, base station 105-a may determine TBS differently depending on a numerology's type. For instance, base station 105-a may determine TBS one way for numerologies associated with OFDM symbols that have a duration less than or equal to a subframe (e.g., 100 us and 200 us CP numerologies) and may determine TBS another way for numerologies with OFDM symbols that have a duration of a greater amount than one subframe (e.g., 300 us, 400 us, and 600 us CP numerologies). Although the present examples may refer to 200 us CP and 400 us CP, it should be noted that numerologies with other CP values and/or OFDM symbol lengths may be used without deviating from the scope of the present disclosure (e.g., 200 us CP may be associated with a variety of OFDM symbol lengths).

In one example, PRBs may be defined differently for certain numerologies. For instance, numerologies with OFDM symbols that have a duration less than a single subframe (e.g., and, in some cases, are evenly divisible within the subframe) may have a PRB width at a same fixed value (e.g., 180 kHz), and numerologies with OFDM symbols that span multiple subframes may have PRB widths that vary on a per-numerology basis. Per-numerology PRB width may be determined based on an inverse ratio of the CP length of a numerology with a reference CP length (e.g., the CP length of the numerology whose OFDM symbols spans a subframe). For instance, a first numerology may have a 400 us CP and may correspondingly have OFDM symbols spanning two subframes. The reference numerology may have a CP length of 200 us and may have OFDM symbols spanning a subframe. The ratio of the CP length of the first numerology to the CP length of the other numerology may be 2:1. The PRB width of the other numerology may be 180 kHz. As such, the PRB width of the first numerology may be 90 kHz (e.g., and may be 60 kHz for 600 us CP, 45 kHz for 800 us CP, and so on). Decreasing PRB width may increase the number of RBs that may fit within a single slot. As such, the 400 us CP numerology may have twice as many RBs as the 200 us numerology (e.g., and the 600 us CP may have three times as many, the 800 us CP may have four times as many, and so on). TBS may then be determined based on assuming that the CP numerology has twice as many RBs as the 400 us numerology. Core symbol length (e.g., the OFDM symbol length of a given numerology) and/or number of subcarriers may, additionally or alternatively, be used in a similar fashion as CP length to determine the PRB width. For instance, if a first numerology has slots and/or OFDM symbols twice as long as that of a reference numerology, the PRB width of the first numerology may be half that of the reference numerology.

Additionally or alternatively, all numerologies may have the same defined PRB width, but UE 115-a may utilize a scaling factor on the number of PRBs (e.g., a scaling factor to $N_{PRB}$) while determining TBS for numerologies with OFDM symbols that span multiple subframes. For instance, a first numerology of 200 us CP may have the same number of PRBs as a second numerology of 400 us CP. However, the second numerology may use a scaling factor while the first numerology may not (e.g., assuming that the first numerology does not have OFDM symbols that span multiple subframes). The scaling factor may be proportional to the ratio of the CP length of a signaled numerology to that of a reference numerology (e.g., the CP length of the numerology whose OFDM symbols spans one subframe). For instance, if the CP length of the signaled numerology is 400 us CP and that of the reference numerology is 200 us CP, the scaling factor may be 2 (e.g., 400 us/200 us). Core symbol length and/or number of subcarriers may, additionally or alternatively, be used in a similar fashion as CP length to determine the scaling factor. For instance, if a first numerology has slots and/or OFDM symbols twice as long as that of a reference numerology, the scaling factor of the first numerology may be twice that of the reference numerology.

Additionally or alternatively, a layer factor may be introduced that corresponds to a reference number of layers and may be used by a UE when determining TBS. The layer factor may be proportional to the ratio of the CP length of a signaled numerology to that of a reference numerology (e.g., the CP length of the numerology whose OFDM symbols spans a subframe). For instance, if the CP length of the signaled numerology is 400 us CP and that of the reference numerology is 200 us CP, the layer factor may be 2 (e.g., 400 us/200 us). The layer factor may point to an entry of a table that indicates that the TBS is mapped to the same number of spatial layers as the layer factor (e.g., 2 for a signaled numerology of 2). It should be noted that the TBS may be mapped to a single layer, but that TBS may be determined as though the TBS is mapped to multiple layers (e.g., 2 in the present example). Core symbol length and/or number of subcarriers may, additionally or alternatively, be used in a similar fashion as CP length to determine the layer factor. For instance, if a first numerology has slots and/or OFDM symbols twice as long as that of a reference numerology, the layer factor of the first numerology may be twice that of the reference numerology.

Additionally or alternatively, a UE may map multiple TBs to one OFDM symbol for numerologies with OFDM symbols that span multiple subframes. The number of TBs may be proportional to the ratio of the CP length of a signaled numerology to that of a reference numerology (e.g., the CP length of the numerology whose OFDM symbols spans one subframe). For instance, if the CP length of the signaled numerology is 400 us CP and that of the reference numerology is 200 us CP, the number of TBs mapped to the signaled numerology may be 2. Additionally or alternatively, the number of TBs may be proportional to the number of subframes spanned by the signaled numerology (e.g., 2 TBs if 2 subframes are spanned, 3 TBs if 3 subframes are spanned, and so on). Each TBS of the multiple TBs may be determined similar in a similar fashion to how TBS is determined for the numerology whose OFDM symbol spans a subframe. For instance, if the number of TBs is 2, the first and second TBs may each have their TBS determined in a similar manner as a TB in the 200 us CP may have its TBS determined. In some cases, MAC and/or higher layers may be adjusted to enable multiple TBs to be mapped to a single slot. The mapping and/or interleaving used to map multiple TBs to a single slot may include inter-codeword interleaving or inter-TB interleaving. Core symbol length and/or number of subcarriers may, additionally or alternatively, be used in a similar fashion as CP length to determine the number of TBs. For instance, if a first numerology has slots and/or OFDM symbols twice as long as that of a reference numerology, the number of TBs mapped to one OFDM symbol in the first numerology may be twice that of the reference numerology.

Additionally or alternatively, a UE may determine an initial TBS the same way for all numerologies, but may scale the TBS to determine a new TBS value for numerologies with OFDM symbols that span multiple subframes (e.g., the initial TBS may be multiplied by an alpha factor). For instance, a first numerology of 200 us CP may have a same initial TBS as a second numerology of 400 us CP. However, the second numerology may scale the initial TBS to determine the final TBS while the first numerology may assume the initial TBS is the final TBS (e.g., assuming that the first numerology does not have OFDM symbols that span multiple subframes). The scaled TBS may then be mapped to a closest valid TBS (e.g., a closest TBS size listed in a preconfigured table). Core symbol length and/or number of subcarriers may, additionally or alternatively, be used in a similar fashion as CP length to determine whether to scale an initial TBS and/or how much to scale an initial TBS by. For instance, if a first numerology has slots and/or OFDM symbols twice as long as that of a reference numerology, the initial TBS of the first numerology may be scaled to twice that of the reference numerology.

In some cases, UE 115-a and/or base station 105-a may determine TBS differently depending on the sparsity of an RS pattern. If the RS pattern is sparse in the frequency domain, the TBS may be determined based on the sparseness in the frequency domain and/or the numerology as described herein. If the RS pattern is sparse in the time domain (e.g., if some symbols and/or slots have more RS than others or if some symbols and/or slots have RS and others do not), different TBS may be determined for different slots. For instance, TBS may be determined for each symbol and/or slot such that the TBs in each symbol and/or slot have the same or approximately the same coding rate as other symbols and/or slots (e.g., the other symbols and/or slots in the same neighborhood). In some cases, RS patterns may be signaled together with numerology (e.g., the numerology and the RS patterns may be jointly encoded). The RS patterns may be kept per MBSFN area.

Determining separate TBS and/or modulation schemes for each slot and/or symbol may involve utilizing multiple MCS. In one example, base station 105-a may signal multiple MCS entries to UE 115-a (e.g., via a SIB) for different types of symbols and/or slots. In one example, one MCS may be indicated for symbols and/or slots that have no RS and another may be indicated for symbols and/or slots that have RS. Alternatively, one MCS may be indicated for symbols and/or slots that have no RS; another may be indicated for symbols and/or slots that have 1 RS; and another may be indicated for symbols and/or slots that have 2 RS. Additionally or alternatively, base station 105-a may signal multiple MCS entries for different types of subframes (e.g., subframes with different RS patterns).

In another example, base station 105-a may signal a single MCS to UE 115-a, which the UE may use to derive multiple TBS and/or modulation schemes. For instance, UE 115-a may receive an MCS with index X, which UE 115-a may use to determine TBS for symbols and/or slots and/or subframes without RS, and the UE may assume that MCS with index X−1 is to be used to determine TBS for symbols and/or slots and/or subframes with RS. Alternatively, UE 115-a may receive an MCS with index X, which UE 115-a may use for symbols and/or slots and/or subframes without RS, and UE 115-a may assume that MCS with index X−1 is to be used for symbols and/or slots and/or subframes with one RS, and UE 115-*a* may assume that MCS with index X−2 is to be used for symbols and/or slots and/or subframes with two RS. It should be noted that other functions may be used and that the MCS that UE 115-*a* receives may be alternatively used to determine TBS for symbols and/or slots and/or subframes that include RS or a certain number of RS and an MCS used for symbols and/or slots and/or subframes without RS may be derived.

In some cases, reporting capabilities in reports from UE 115-*a* to base station 105-*a* may include scaling values for RS patterns. Receiving certain RS patterns may involve utilizing more resources than others (e.g., the RS pattern of a baseline 15 kHz unicast transmission). As such, UE 115-*a* may indicate a scaling value to base station 105-*a* to notify base station 105-*a* how many resources and/or CCs the UE 115-*a* may use to receive MBMS with certain RS patterns. For instance, UE 115-*a* may notify base station 105-*a* that receiving an MBMS using a first RS pattern (i.e., RS1) may involve utilizing twice as many resources and/or CCs as a baseline unicast transmission and receiving an MBMS using a second RS pattern (i.e., RS2) may involve utilizing three times as many resources and/or CCs. Additionally or alternatively, UE 115-*a* may include other capabilities such as notifying how many CCs in a carrier aggregation (CA) are supported, or a total maximum aggregated bandwidth across all CCs. At some point, base station 105-*a* may begin transmitting MBMS using RS1 to UE 115-*a*. If a baseline unicast transmission is associated with using 1 CC, RS1 may be associated with using 2 CC. If UE 115-*a* starts receiving MBMS using RS1 from another base station 105, UE 115-*a* may notify the other base station 105 that UE 115-*a* is receiving MBMS from base station 105-*a* using RS1. The other base station 105 may assume that UE 115-*a* is using 2 CC for the MBMS from base station 105-*a* and may limit CA appropriately. For instance, if UE 115-*a* supports a CA of 5 CC and base station 105-*a* is transmitting an MBMS using RS1 to UE 115-*a*, which may use 2 CC, the other base station may limit unicast carrier aggregation to 3 CC. In some cases, an MBMS interest indication may also include the RS pattern that a service is to use or used.

In some cases, one or more TBs may be transformed into one or more codeblocks. Each codeblock of the one or more codeblocks may be mapped to a unique subchannel and symbol combination. As the length of slots of numerologies increase, the width of subchannels may decrease. As such, codeblocks mapped to consecutive subchannels (e.g., via frequency-first mapping) in numerologies with slots of higher length may have poorer frequency diversity than codeblocks mapped to consecutive subchannels in numerologies with slots of lower length. To mitigate this issue, base station 105-*a* may apply different mappings and/or pre-apply an interleaver (e.g., a symbol-level interleaver) to codeblocks (e.g., PMCH codeblocks) based on the numerology. If a numerology is associated with a sufficiently high subcarrier spacing, base station 105-*a* may still utilize frequency-first mapping. However, numerologies with a lower subcarrier spacing than the sufficiently high subcarrier spacing may, for instance, be arranged such that not all codeblocks are placed in consecutive subchannels. Additionally or alternatively, base station 105-*a* may apply different mappings and/or pre-apply an interleaver to codeblocks based on TBS, MCS, bandwidth, number of codeblocks, or a combination. Additionally or alternatively, base station 105-*a* may utilize VRB to PRB mapping.

In some cases, a PMCH may occur with a certain periodicity (e.g., a PMCH may occur once every number of subframes). The periodicity may be scheduled in mch-SchedulingPeriod and/or sf-AllocEnd fields and may be in terms of subframes (e.g., 1 ms subframes). If a numerology is associated with an OFDM symbol spanning multiple subframes, however, PMCH sent via this numerology may be sent over multiple subframes. UE 115-*a* may account for this by determining a duration based on the numerology and the indicated subframe where PMCH is to be transmitted. For instance, UE 115-*a* may receive signaling from base station 105-*a* (e.g., a SIB) indicating that PMCH is to occur at subframe n. If a PMCH is associated with a numerology that has OFDM symbols spanning multiple subframes, UE 115-*a* may assume that PMCH will occur up to a subframe n+k, where k is determined based on the numerology. The value k may, for instance, be equal to the ratio of the CP length of the numerology of the PMCH to that of a reference numerology (e.g., the CP length of the numerology whose OFDM symbols spans a subframe) minus one. For instance, if the CP length of the numerology of the PMCH is 400 us CP and that of the reference numerology is 200 us CP, k may be equal to n+2−1=n+1. As such, PMCH may be transmitted over subframes n and n+1.

Additionally or alternatively, base station 105-*a* may transmit a slot number instead of a subframe number to UE 115-*a*, which UE 115-*a* may use in view of the numerology of the PMCH to determine in what subframe the UE 115-*a* is to expect the PMCH transmission. For instance, UE 115-*a* may receive an indication from base station 105-*a* that PMCH is to occur in slot 2. If the numerology of the PMCH transmission has a CP length of 400 us CP, UE 115-*a* may assume that each slot spans two subframes. As such, UE 115-*a* may expect to receive PMCH in subframe 4.

Figure 3:
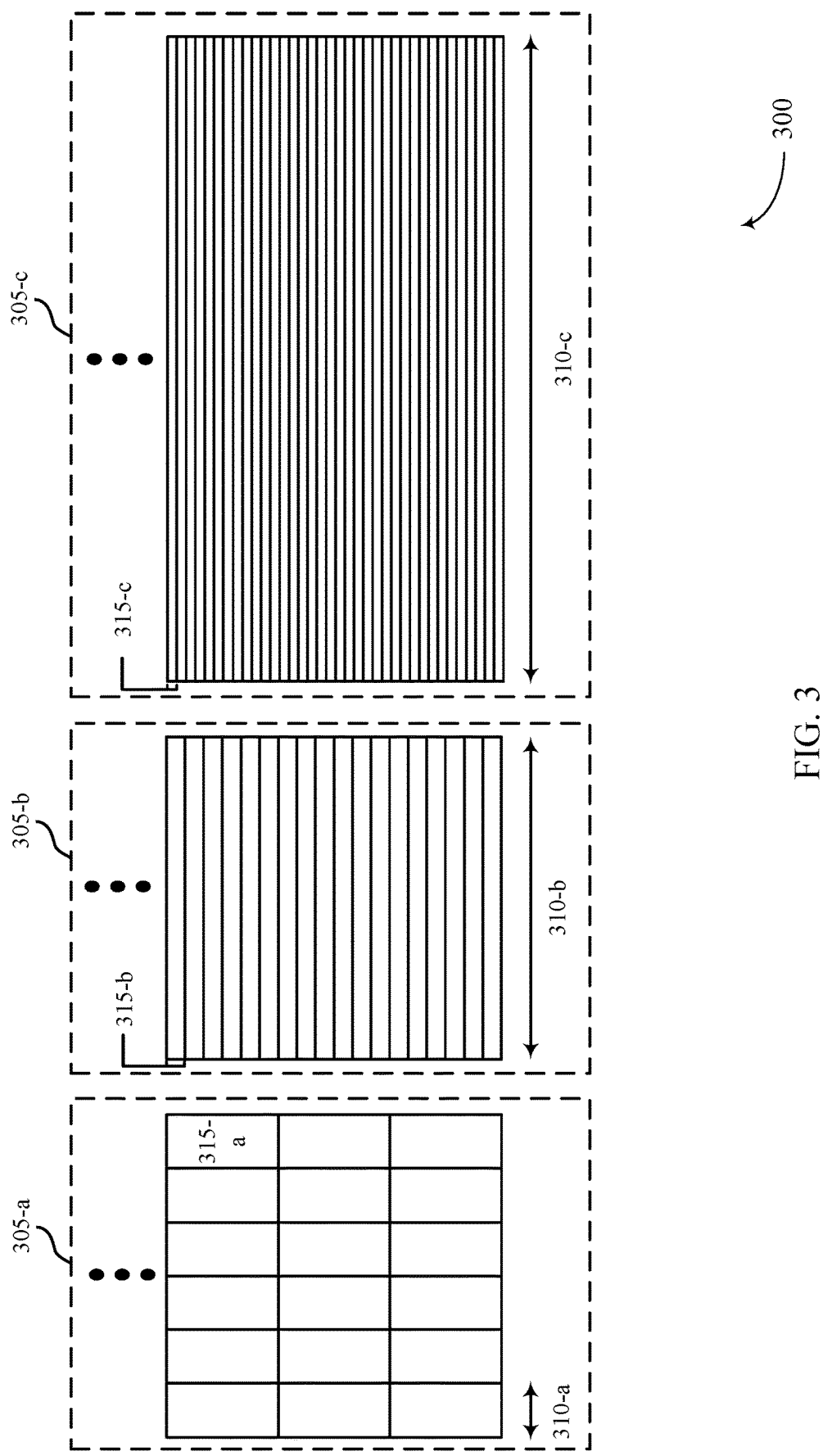
FIG. 3 illustrates an example of a numerology comparison that supports MBMS with new numerologies and RS patterns in accordance with aspects of the present disclosure.

FIG. 3 illustrates an example of a numerology comparison 300 that supports MBMS with new numerologies and RS patterns in accordance with aspects of the present disclosure. In some examples, numerology comparison 300 may implement aspects of wireless communications systems 100 and/or 200. Numerology comparison 300 may be implemented by a base station 105 and/or a UE 115 as described with reference to wireless communications systems 100 and/or 200.

Numerology comparison 300 may include numerology schemes 305-*a*, 305-*b*, and 305-*c*. Each numerology scheme 305 may have one or more slots 310 (e.g., numerology scheme 305-*a* may be associated with slot 310-*a*, numerology scheme 305-*b* may be associated with slot 310-*b*, and numerology scheme 305-*c* may be associated with slot 310-*c*). Each slot may contain one OFDM symbol. Numerology scheme 305-*a* may have 6 slots 310-*a* per subframe, numerology scheme 305-*b* may have 1 slot 310-*b* per subframe, and numerology scheme 305-*c* may have 2 subframes per slot 310-*c*.

Additionally, each numerology scheme 305 may have a certain number of resources 315. Numerology scheme 305-*a* may be associated with resources 315-*a*, numerology scheme 305-*b* may be associated with resources 315-*b*, and numerology scheme 305-*c* may be associated with resources 315-*c*. Numerology schemes 305-*a* and 305-*b* may both have a same number of resources 315 (e.g., numerology scheme 305-*a* may have 18 resources 315-*a* and numerology scheme 305-*b* may have 18 resources 315-*b*) but may have half as many resources as numerology scheme 305-*c* (e.g., numerology scheme 305-*c* may have 36 resources). Numerology scheme 305-*c* may have twice as many resources because slot 310-*c* may be twice as long as slots 310-*b* and 310-*c*, but may have subchannels spread over a same frequency range.

Figure 4:
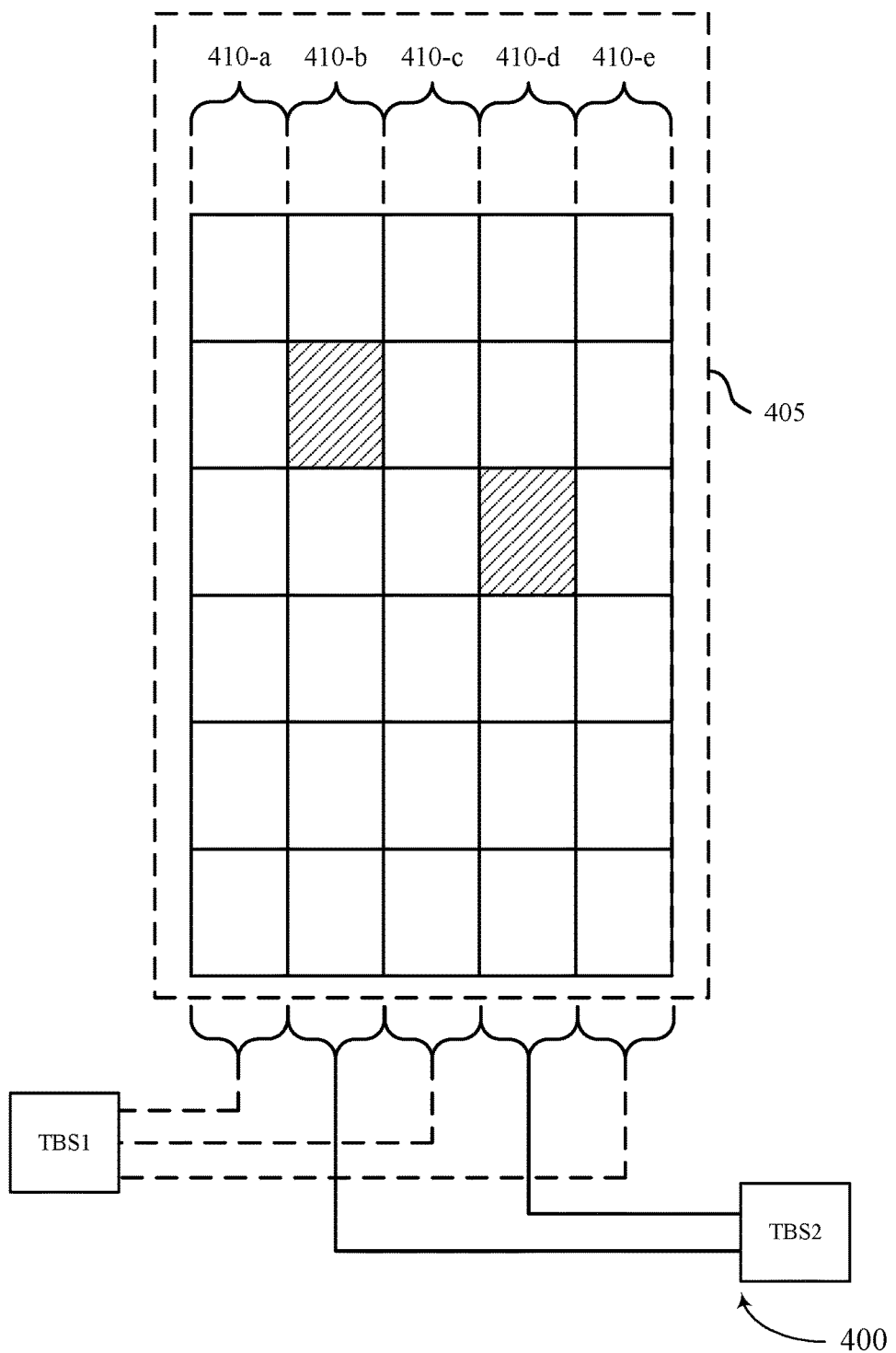
FIG. 4 illustrates an example of a TBS determination process that supports MBMS with new numerologies and RS patterns in accordance with aspects of the present disclosure.

FIG. 4 illustrates an example of a TBS determination process 400 that supports MBMS with new numerologies and RS patterns in accordance with aspects of the present disclosure. In some examples, TBS determination process 400 may implement aspects of wireless communications systems 100 and/or 200. For instance, TBS determination may be implemented by a base station 105 and/or a UE 115 as described with reference to wireless communications systems 100 and/or 200.

TBS determination process 400 may involve a window 405 with one or more resources 410. In some cases, resources 410 may represent resources spanning a symbol and/or slot. In such cases, resources 410-b and 410-d may represent symbols and/or slots that include RS resources 415. Resources 410-a, 410-c, and 410-e, meanwhile, may represent symbols and/or slots that don't include RS (i.e., no RS resources 420). In other cases, resources 410 may represent resources spanning a subframe. In such cases, resources 410-b and 410-d may represent subframes that include RS resources 415. Resources 410-a, 410-c, and 410-e, meanwhile, may represent subframes that don't include RS (i.e., no RS resources 420). In either case, a UE 115 may determine, through the methods described herein, that resources 410-a, 410-c, and 410-e may be associated with a first MCS and carry a TB with a first TBS (i.e., TBS1) and may determine that resources 410-b and 410-d may be associated with a second MCS and carry a TB with a second TBS (i.e., TBS2).

Figure 5:
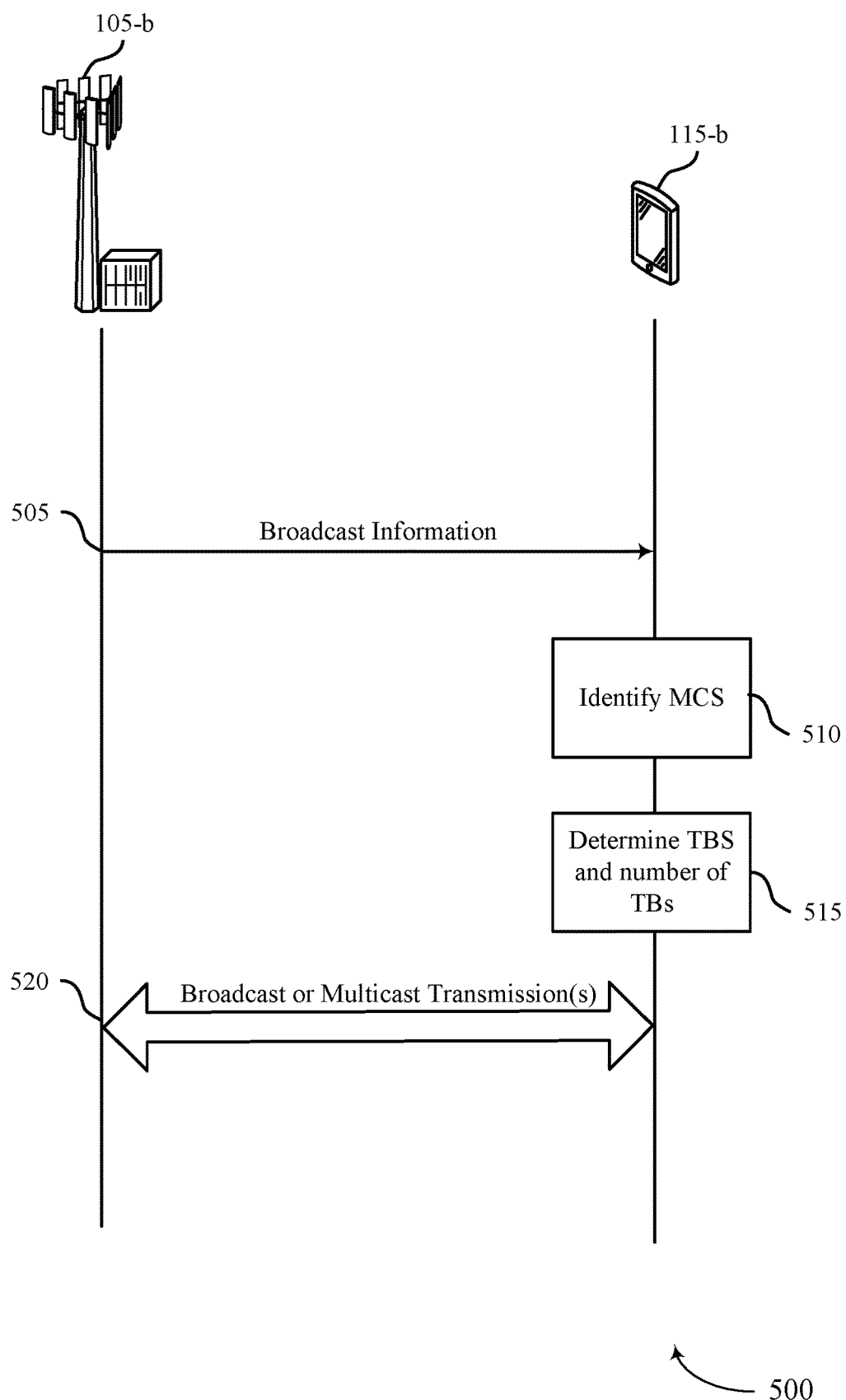
FIG. 5 illustrates an example of a process flow that supports MBMS with new numerologies and RS patterns in accordance with aspects of the present disclosure.

FIG. 5 illustrates an example of a process flow 500 that supports MBMS with new numerologies and RS patterns in accordance with aspects of the present disclosure. In some examples, process flow 500 may implement aspects of wireless communications systems 100 and/or 200. Process flow 500 may be implemented by base station 105-b and UE 115-b, which may be examples of a base station 105 and/or a UE 115 as described with reference to wireless communications system 100 and/or 200.

At 505, base station 105-b may transmit broadcast information indicating one or more of a numerology or a RS pattern to be used in broadcast or multicast transmissions (e.g., a PMCH). UE 115-b may receive the broadcast information. Base station 105-b may, additionally or alternatively, transmit an indication of one of a plurality of MCS tables which UE 115-b is to reference in determining the MCS.

At 510, UE 115-b may identify an MCS associated with the broadcast or multicast transmissions. In some cases, UE 115-b may identify the MCS based on a preconfigured MCS table that is utilized based on the indicated numerology or RS pattern. Additionally or alternatively, UE 115-b may identify the MCS based on referencing a single MCS table that accounts for all or some configured numerologies or RS patterns. Additionally or alternatively, UE 115-b may identify multiple MCSs to determine TBSs for multiple TBS based on a density of RSs within a symbol and/or slot. UE 115-b may identify the multiple MCSs based on receiving multiple indications from base station 105-b or may receive a single indication and determine multiple MCSs from the single indication.

At 515, UE 115-b may determine TBS and/or a number of TBs based on the MCS and at least one of the numerology or the RS pattern. In some cases, TBS may be determined based on a symbol duration of the numerology. For instance, TBS may be determined differently for numerologies with symbol durations that span multiple subframes compared to numerologies with symbol durations that span a single subframe. Additionally or alternatively, UE 115-b may identify that an RB has a bandwidth that is less than and/or divisible evenly into 180 kHz and may determine the TBS based on a number of RBs within a slot of the broadcast or multicast transmissions. Additionally or alternatively, UE 115-b may determine the TBS based on a scaled number of RBs within a slot. Additionally or alternatively, UE 115-b may determine the TBS based on a reference number of spatial layers. Additionally or alternatively, UE 115-b may determine to map multiple TBs to a single slot. Additionally or alternatively, UE 115-b may determine an initial TBS and scale the TBS if the numerology has a symbol duration longer than a subframe.

At 520, UE 115-b may communicate with base station 105-b via broadcast and/or multicast transmissions in accordance with the TBS.

Figure 6:
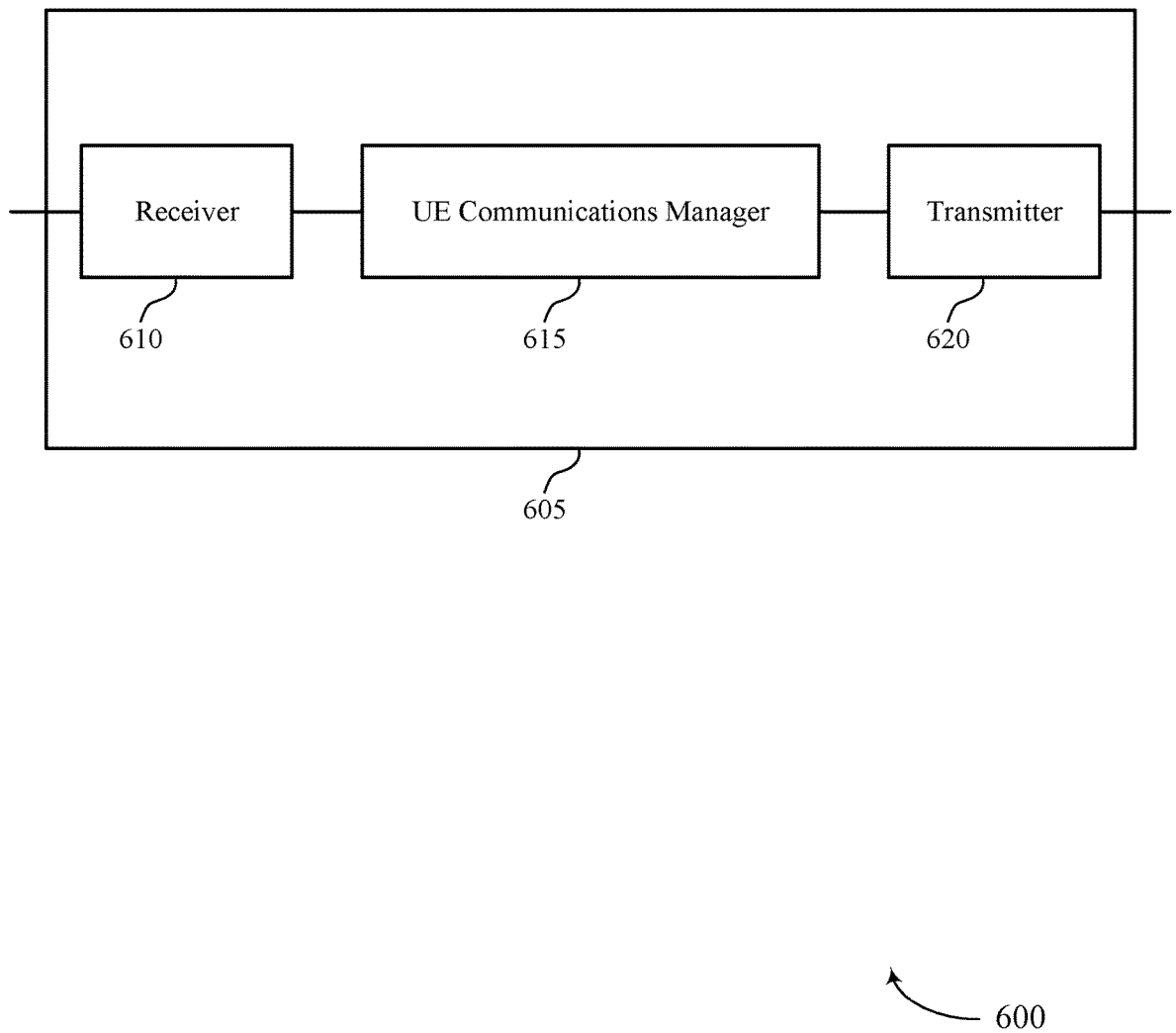
FIGS. 6 and 7 show block diagrams of devices that support MBMS with new numerologies and RS patterns in accordance with aspects of the present disclosure.

FIG. 6 shows a block diagram 600 of a device 605 that supports MBMS with new numerologies and RS patterns in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to MBMS with new numerologies and RS patterns, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive, from a base station, broadcast information indicating one or more of a numerology or a RS pattern to be used in broadcast or multicast transmissions, identify an MCS associated with the broadcast or multicast transmissions, determine one or more of a TBS or a number of TBs based at least on the MCS and at least one of the numerology or the RS pattern, and communicate via the broadcast or multicast transmissions in accordance with at least one of the TBS or the number of TBs. The actions performed by the UE communications manager 615 as described herein may be implemented to realize one or more potential advantages. One implementation may allow a UE 115 to save power and increase battery life by more optimally mapping between TBS and MCS when overhead for PMCH is different than overhead for PDSCH. This may enable faster and more efficient determination of a TBS for communication between a UE 115 and a base station 105, avoiding a lengthy or suboptimal mapping. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
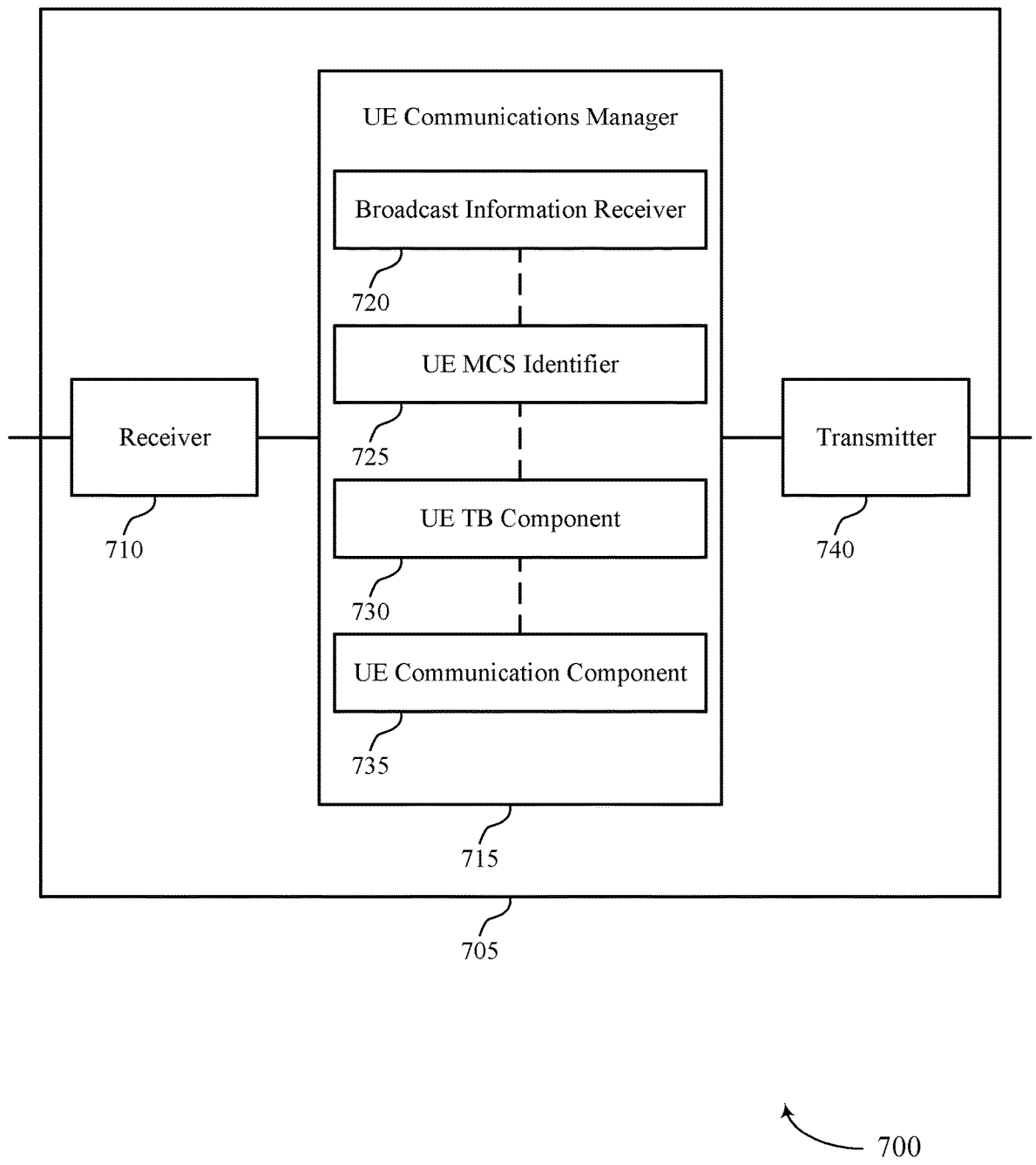

FIG. 7 shows a block diagram 700 of a device 705 that supports MBMS with new numerologies and RS patterns in accordance with aspects of the present disclosure. The device 705 may be an example of aspects of a device 605, or a UE 115 as described herein. The device 705 may include a receiver 710, a UE communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to MBMS with new numerologies and RS patterns, etc.). Information may be passed on to other components of the device 705. The receiver 710 may be an example of aspects of the transceiver 920 described with reference to FIG. 9. The receiver 710 may utilize a single antenna or a set of antennas. Based on mapping between TBS and MCS according to the techniques described herein, a processor of a UE 115 (e.g., controlling the receiver 710, the transmitter 740, or the transceiver 920 as described with reference to FIG. 9) may efficiently determine a TBS for communication between the UE 115 and a base station 105. Because of the efficient and optimal mapping techniques described herein, the processor may perform the operations for determining a TBS with lower computational costs and processing complexities, saving processing time and power.

The UE communications manager 715 may be an example of aspects of the UE communications manager 615 as described herein. The UE communications manager 715 may include a broadcast information receiver 720, a UE MCS identifier 725, a UE TB component 730, and a UE communication component 735. The UE communications manager 715 may be an example of aspects of the UE communications manager 910 described herein.

The broadcast information receiver 720 may receive, from a base station, broadcast information indicating one or more of a numerology or a RS pattern to be used in broadcast or multicast transmissions.

The UE MCS identifier 725 may identify an MCS associated with the broadcast or multicast transmissions.

The UE TB component 730 may determine a TBS or a number of TBs based at least on the MCS and at least one of the numerology or the RS pattern.

The UE communication component 735 may communicate via the broadcast or multicast transmissions in accordance with the TBS or the number of TBs.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
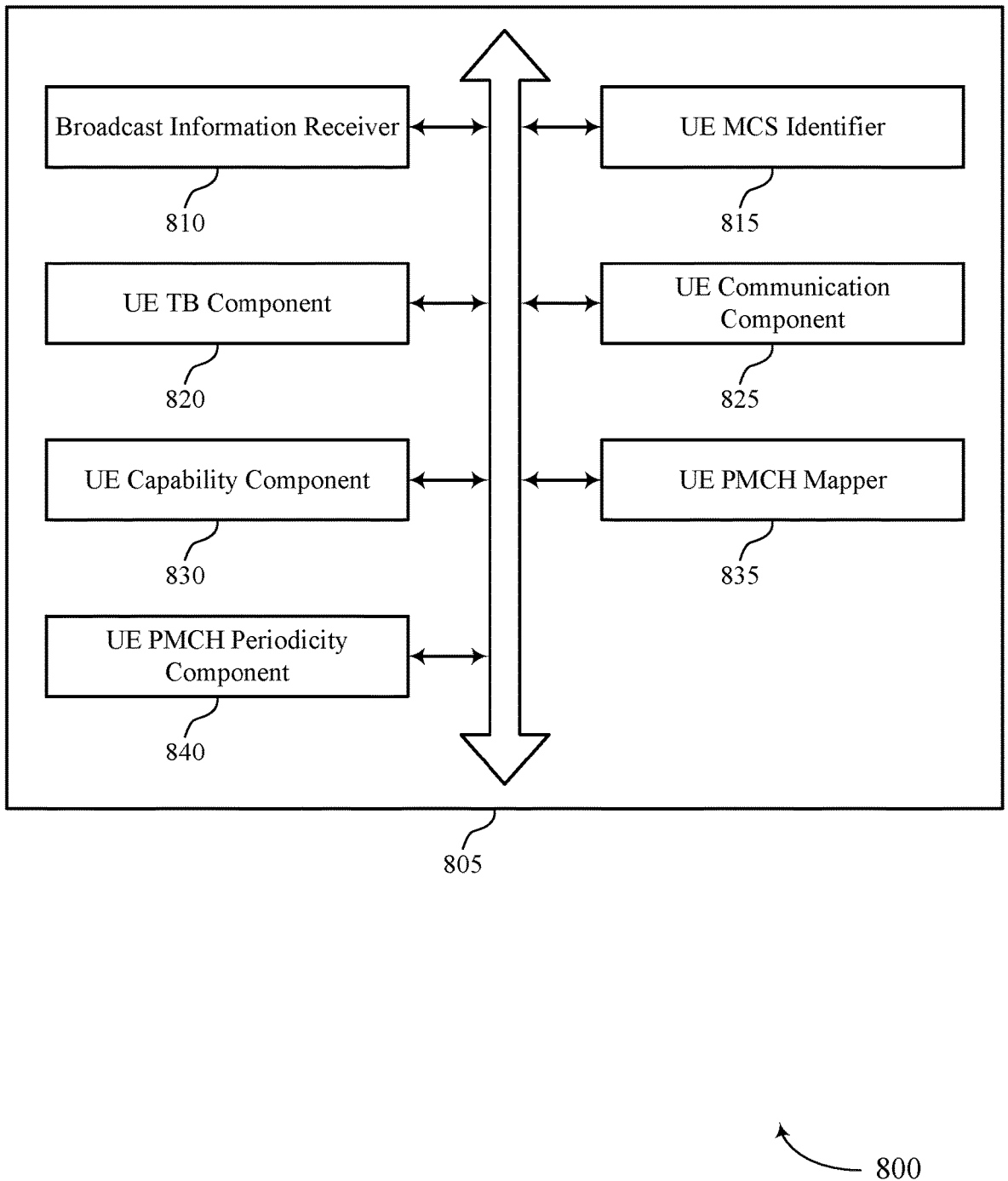
FIG. 8 shows a block diagram of a user equipment (UE) communications manager that supports MBMS with new numerologies and RS patterns in accordance with aspects of the present disclosure.

FIG. 8 shows a block diagram 800 of a UE communications manager 805 that supports MBMS with new numerologies and RS patterns in accordance with aspects of the present disclosure. The UE communications manager 805 may be an example of aspects of a UE communications manager 615, a UE communications manager 715, or a UE communications manager 910 described herein. The UE communications manager 805 may include a broadcast information receiver 810, a UE MCS identifier 815, a UE TB component 820, a UE communication component 825, a UE capability component 830, a UE PMCH mapper 835, and a UE PMCH periodicity component 840. Each of these modules may communicate, directly or indirectly, with one another (e.g., via one or more buses).

The broadcast information receiver 810 may receive, from a base station, broadcast information indicating one or more of a numerology or a RS pattern to be used in broadcast or multicast transmissions. In some examples, the broadcast information receiver 810 may receive both the numerology and the RS pattern as part of the broadcast information. In some cases, the numerology and the RS pattern are jointly encoded.

The UE MCS identifier 815 may identify an MCS associated with the broadcast or multicast transmissions. In some examples, the UE MCS identifier 815 may receive an indication of one of a set of MCS tables which the UE is to reference in determining the MCS. In some examples, the UE MCS identifier 815 may identify an MCS table based on at least one of the numerology or the RS pattern. In some examples, the UE MCS identifier 815 may reference an MCS table that accounts for each of a set of numerologies or RS patterns that could be signaled to the UE. In some examples, the UE MCS identifier 815 may determine a set of MCSs based on a density of RSs within a slot of the broadcast or multicast transmissions. In some examples, the UE MCS identifier 815 may receive, from the base station, multiple indications corresponding to the set of MCSs. In some examples, the UE MCS identifier 815 may receive, from the base station, an indication of a single MCS. In some examples, the UE MCS identifier 815 may determine, based on the single MCS, the set of MCSs. In some cases, at least one of the set of numerologies accounted for by the MCS table includes a same number of symbols and a different number of subchannels as another of the set of numerologies accounted for by the MCS table.

The UE TB component 820 may determine a TBS or a number TBs based at least on the MCS and at least one of the numerology or the RS pattern. In some examples, the UE TB component 820 may identify a symbol duration based on the numerology. In some examples, the UE TB component 820 may determine the TBS based on the symbol duration. In some examples, the UE TB component 820 may identify, for the numerology, that an RB has a bandwidth that is less than and divisible evenly into 180 kHz. In some examples, the UE TB component 820 may determine the TBS based on a number of RBs within a slot of the broadcast or multicast transmissions. In some examples, the UE TB component

820 may identify a number of RBs within a slot of the broadcast or multicast transmissions. In some examples, the UE TB component 820 may scale the number of RBs within the slot based on the numerology. In some examples, the UE TB component 820 may determine the TBS based on the scaled number of RBs within the slot. In some examples, the UE TB component 820 may identify, based on the numerology, a reference number of spatial layers. In some examples, the UE TB component 820 may determine the TBS based on the reference number of spatial layers. In some examples, the UE TB component 820 may identify, based on the numerology, that multiple TBs are to be mapped to a single slot of the broadcast or multicast transmissions. In some examples, the UE TB component 820 may determine an initial TBS based on a number of RBs within a slot of the broadcast or multicast transmissions. In some examples, the UE TB component 820 may scale the initial TBS using a scaling factor based on the numerology. In some examples, the UE TB component 820 may determine the TBS from a set of available TBSs based on the scaled initial TBS. For instance, UE TB component 820 may select an available TBS among the set of available TBSs. In some examples, the determined TBS may be a closest TBS to the scaled initial TBS in the set of available TBSs.

The UE communication component 825 may communicate via the broadcast or multicast transmissions in accordance with the TBS or the number of TBs.

The UE capability component 830 may transmit, to the base station, UE capability information pertaining to scaling values supportable by the UE associated with RS patterns available to be signaled for use with the broadcast or multicast transmissions. In some examples, the UE capability component 830 may receive a MBMS from the base station, where the MBMS includes one of the RS patterns available to be signaled. In some examples, the UE capability component 830 may transmit, to a second base station, MBMS assistance information including at least the RS pattern included by the MBMS. In some examples, the UE capability component 830 may receive one or more transmissions from the second base station over a set of components carriers, where a total number of the set of CCs is limited based on the scaling values supported by the UE. In some examples, the UE capability component 830 may transmit the UE capability information with a MBMS interest indication.

The UE PMCH mapper 835 may map the broadcast or multicast transmissions to a PMCH according to a numerology-specific mapping. In some examples, the UE PMCH mapper 835 may map first to a VRB. In some examples, the UE PMCH mapper 835 may map from the VRB to a PRB, where the mapping from the VRB to the PRB is numerology-specific. In some cases, the numerology-specific mapping includes a symbol-level interleaving. In some cases, the numerology-specific mapping is based on at least one of the TBS, the MCS, a bandwidth to be used for the broadcast or multicast transmissions, a number of codeblocks to be included in the broadcast or multicast transmissions, or a combination thereof.

The UE PMCH periodicity component 840 may receive an indication specifying a periodicity of a PMCH to be used for the broadcast or multicast transmissions. In some examples, the UE PMCH periodicity component 840 may determine a symbol duration from the indication specifying the periodicity based on the numerology. In some examples, the indication specifying the periodicity may be associated with a number of subframes. For example, the UE PMCH periodicity component 840 may identify a number of subframes to be used for the PMCH based on the indication and the numerology. In some other examples, the indication specifying the periodicity may be associated with a number of slots. For example, the UE PMCH periodicity component 840 may identify the number of slots to be used for the PMCH based on the indication and the numerology.

Figure 9:
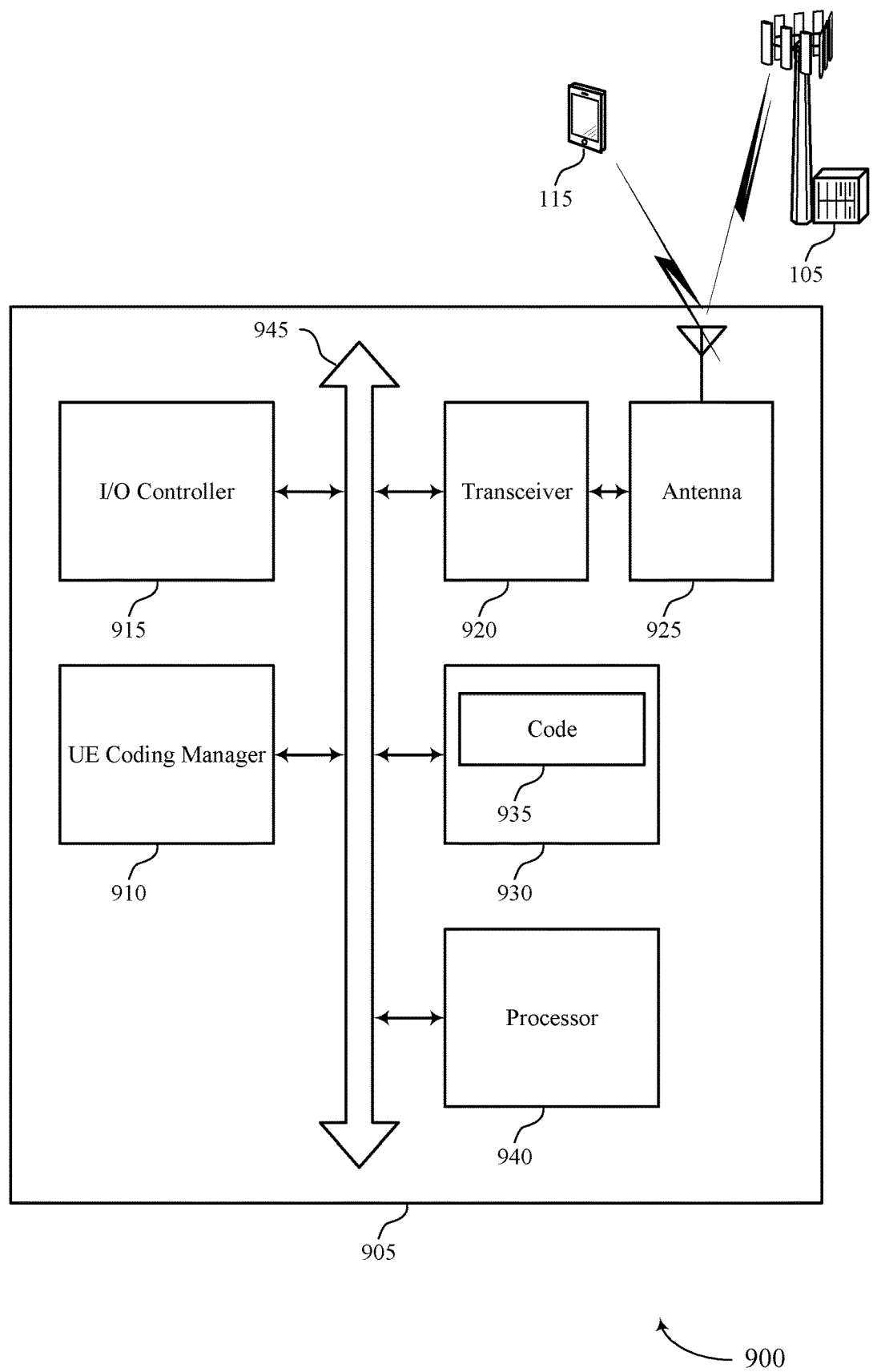
FIG. 9 shows a diagram of a system including a device that supports MBMS with new numerologies and RS patterns in accordance with aspects of the present disclosure.

FIG. 9 shows a diagram of a system 900 including a device 905 that supports MBMS with new numerologies and RS patterns in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive, from a base station, broadcast information indicating one or more of a numerology or a RS pattern to be used in broadcast or multicast transmissions, identify an MCS associated with the broadcast or multicast transmissions, determine a TBS or a number of TBs based at least on the MCS and at least one of the numerology or the RS pattern, and communicate via the broadcast or multicast transmissions in accordance with the TBS or the number of TBs.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting MBMS with new numerologies and RS patterns).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
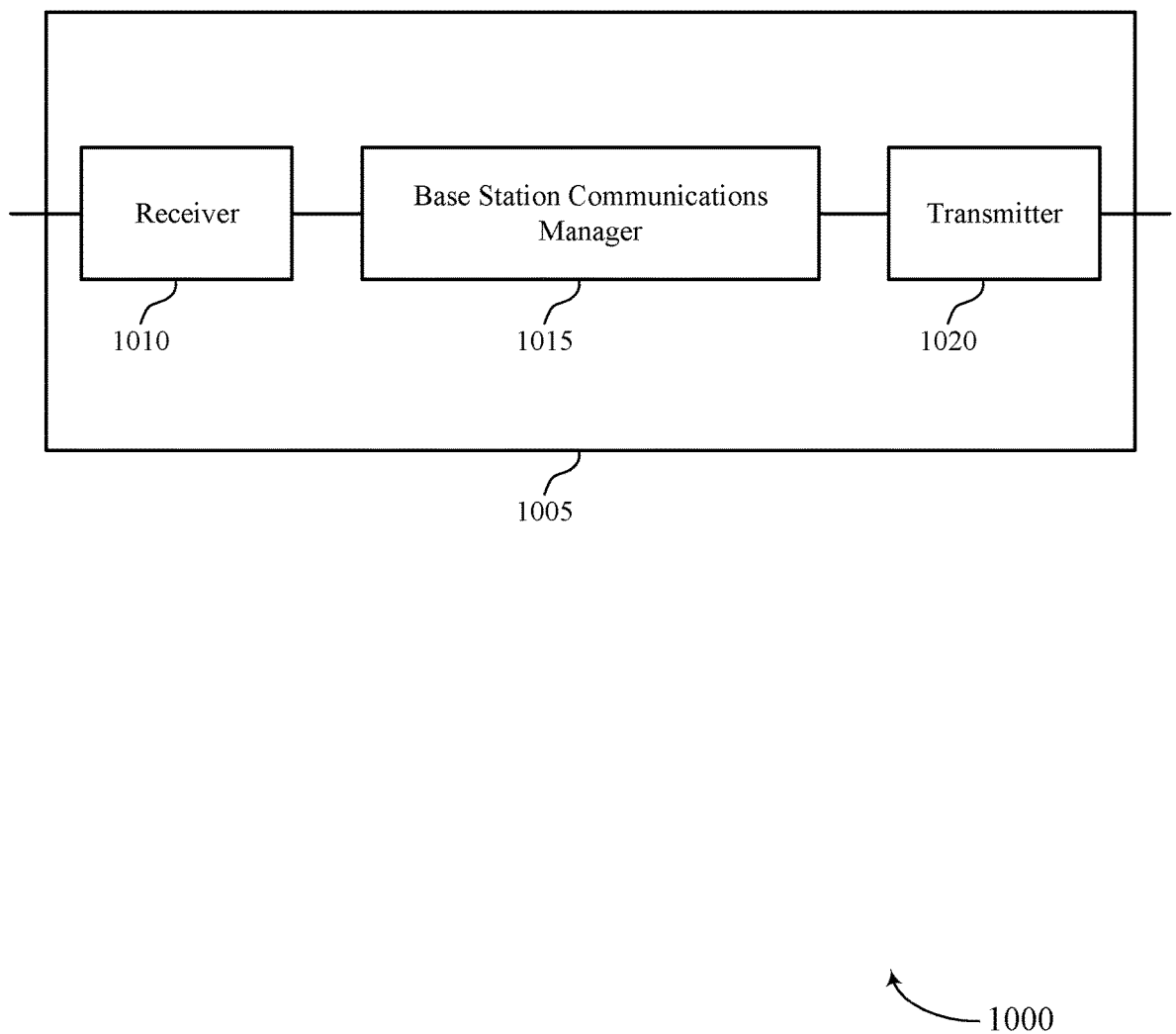
FIGS. 10 and 11 show block diagrams of devices that support MBMS with new numerologies and RS patterns in accordance with aspects of the present disclosure.

FIG. 10 shows a block diagram 1000 of a device 1005 that supports MBMS with new numerologies and RS patterns in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to MBMS with new numerologies and RS patterns, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit, to a UE, broadcast information indicating one or more of a numerology or a RS pattern to be used in broadcast or multicast transmissions, identify an MCS associated with the broadcast or multicast transmissions, determine one or more of a TBS or a number of TBs based at least on the MCS and at least one of the numerology or the RS pattern, and communicate via the broadcast or multicast transmissions in accordance with at least one of the TBS and the number of TBs. The actions performed by the base station communications manager 1015 as described herein may be implemented to realize one or more potential advantages. One implementation may allow a base station 105 to save power by more efficiently determining a mapping of an MCS to a TBS. This may save operating time and likewise save power due to shorter operating time. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
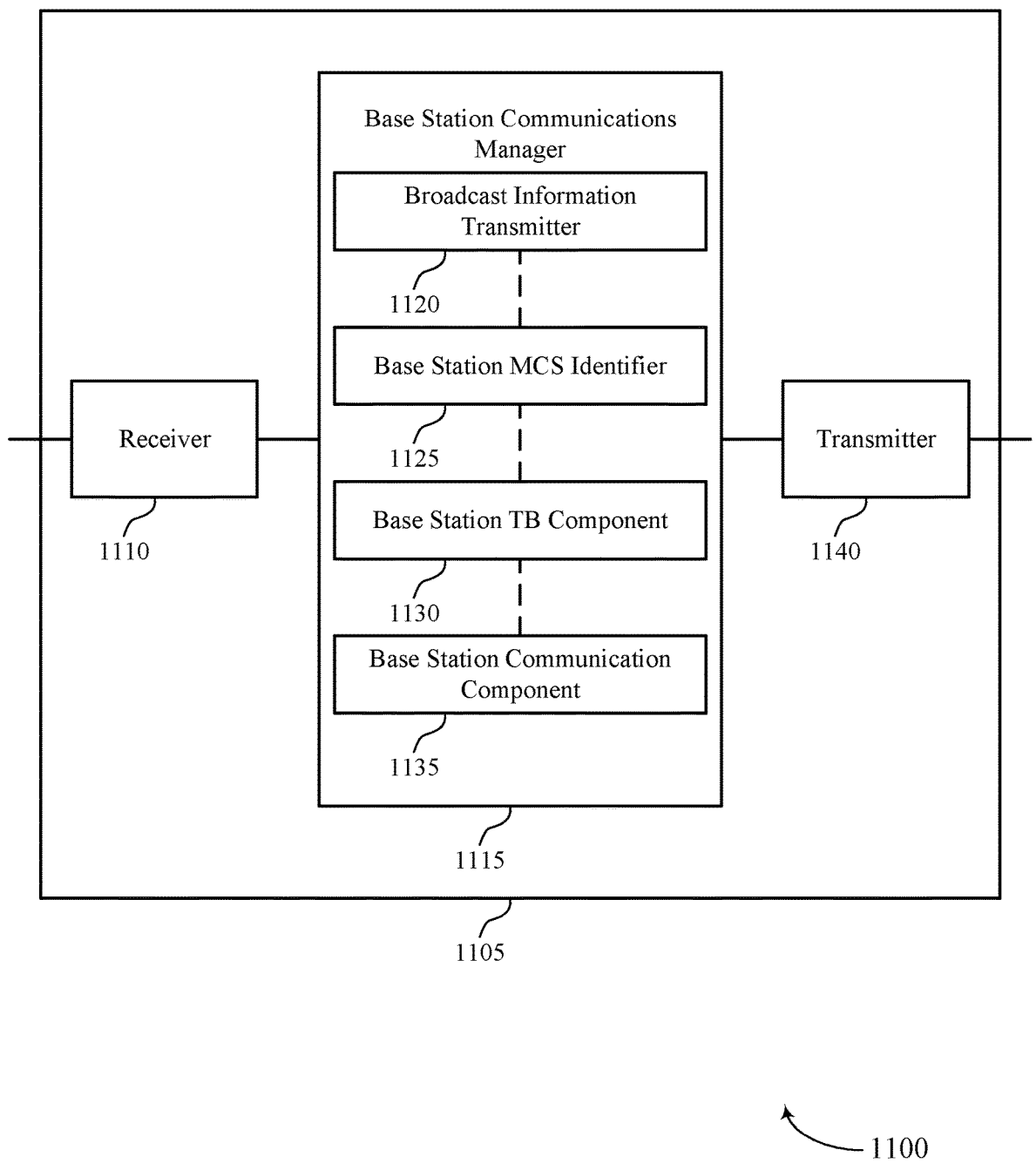

FIG. 11 shows a block diagram 1100 of a device 1105 that supports MBMS with new numerologies and RS patterns in accordance with aspects of the present disclosure. The device 1105 may be an example of aspects of a device 1005, or a base station 105 as described herein. The device 1105 may include a receiver 1110, a base station communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to MBMS with new numerologies and RS patterns, etc.). Information may be passed on to other components of the device 1105. The receiver 1110 may be an example of aspects of the transceiver 1320 described with reference to FIG. 13. The receiver 1110 may utilize a single antenna or a set of antennas. Based on mapping between TBS and MCS according to the techniques described herein, a processor of a base station 105 (e.g., controlling the receiver 1110, the transmitter 1140, or the transceiver 1320 as described with reference to FIG. 13) may efficiently determine a TB S for communication between a UE 115 and the base station 105. Because of the efficient mapping techniques described herein, the processor may perform the operations for determining a TBS with lower computational costs and processing complexities, saving processing time and power.

The base station communications manager 1115 may be an example of aspects of the base station communications manager 1015 as described herein. The base station communications manager 1115 may include a broadcast information transmitter 1120, a base station MCS identifier 1125, a base station TB component 1130, and a base station communication component 1135. The base station communications manager 1115 may be an example of aspects of the base station communications manager 1310 described herein.

The broadcast information transmitter 1120 may transmit, to a UE, broadcast information indicating one or more of a numerology or a RS pattern to be used in broadcast or multicast transmissions.

The base station MCS identifier 1125 may identify an MCS associated with the broadcast or multicast transmissions.

The base station TB component 1130 may determine one or more of a TBS or a number of TBs based at least on the MCS and at least one of the numerology or the RS pattern.

The base station communication component 1135 may communicate via the broadcast or multicast transmissions in accordance with at least one of the TBS and the number of TBs.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
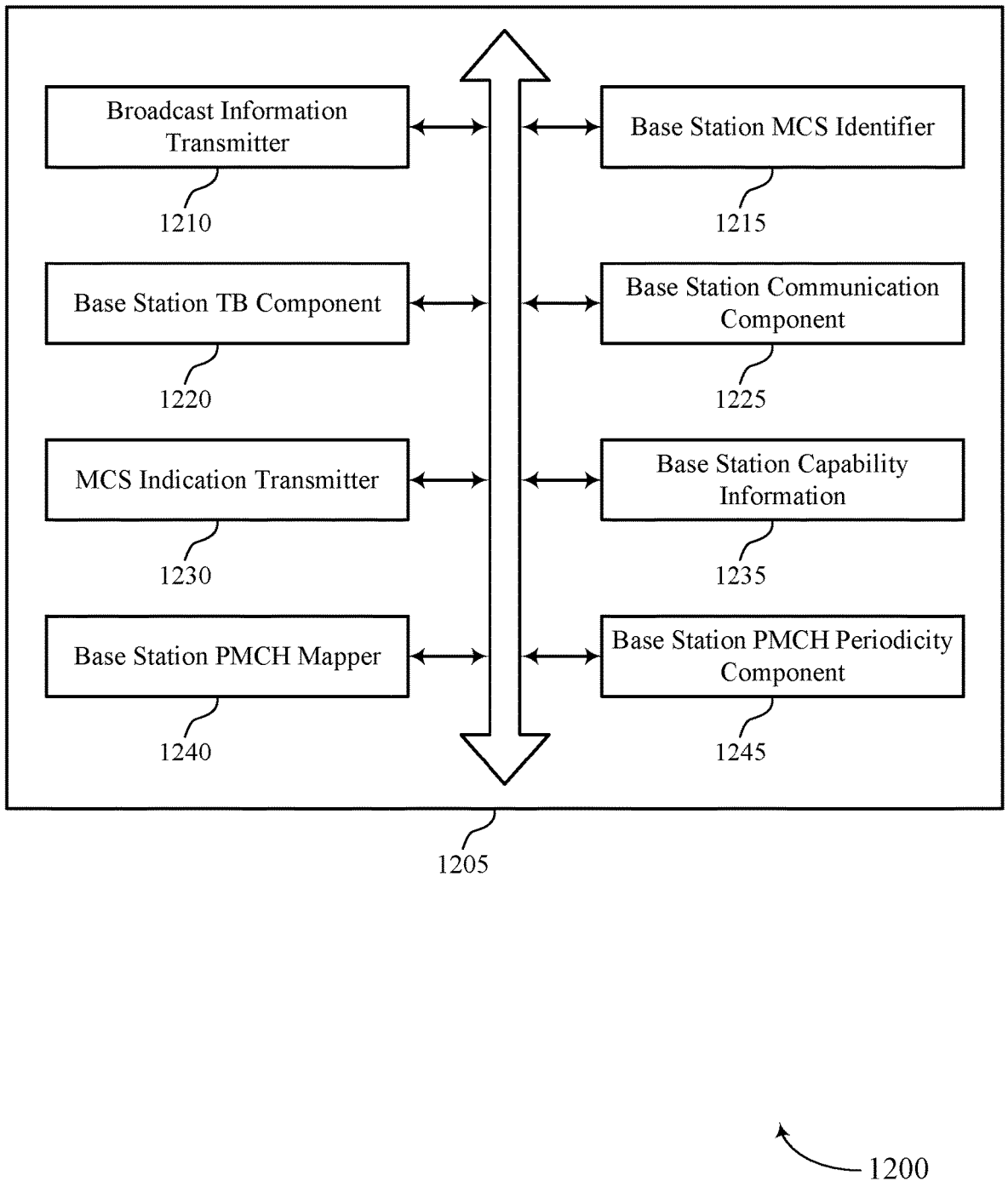
FIG. 12 shows a block diagram of a base station communications manager that supports MBMS with new numerologies and RS patterns in accordance with aspects of the present disclosure.

FIG. 12 shows a block diagram 1200 of a base station communications manager 1205 that supports MBMS with new numerologies and RS patterns in accordance with aspects of the present disclosure. The base station communications manager 1205 may be an example of aspects of a base station communications manager 1015, a base station communications manager 1115, or a base station communications manager 1310 described herein. The base station communications manager 1205 may include a broadcast information transmitter 1210, a base station MCS identifier 1215, a base station TB component 1220, a base station communication component 1225, an MCS indication transmitter 1230, a base station capability information 1235, a base station PMCH mapper 1240, and a base station PMCH periodicity component 1245. Each of these modules may communicate, directly or indirectly, with one another (e.g., via one or more buses).

The broadcast information transmitter 1210 may transmit, to a UE, broadcast information indicating one or more of a numerology or a RS pattern to be used in broadcast or multicast transmissions. In some examples, the broadcast information transmitter 1210 may transmit both the numerology and the RS pattern as part of the broadcast information. In some cases, the numerology and the RS pattern are jointly encoded.

The base station MCS identifier 1215 may identify an MCS associated with the broadcast or multicast transmissions. In some examples, the base station MCS identifier 1215 may identify a MCS table based on at least one of the numerology or the RS pattern. In some examples, the base station MCS identifier 1215 may reference a MCS table that accounts for each of a set of numerologies or RS patterns that could be signaled to the UE. In some examples, the base station MCS identifier 1215 may determine a set of MCSs based on a density of RSs within a slot of the broadcast or multicast transmissions. In some examples, the base station MCS identifier 1215 may transmit, to the UE, multiple indications corresponding to the set of MCSs. In some cases, at least one of the set of numerologies accounted for by the MCS table includes a same number of symbols and a different number of subchannels as another of the set of numerologies accounted for by the MCS table.

The base station TB component 1220 may determine one or more of a TBS or a number of TBs based at least on the MCS and at least one of the numerology or the RS pattern. In some examples, the base station TB component 1220 may identify a symbol duration based on the numerology. In some examples, the base station TB component 1220 may determine the TBS based on the symbol duration. In some examples, the base station TB component 1220 may identify, for the numerology, that an RB has a bandwidth that is less than and divisible evenly into 180 kHz. In some examples, the base station TB component 1220 may determine the TBS based on a number of RBs within a slot of the broadcast or multicast transmissions.

In some examples, the base station TB component 1220 may identify a number of RBs within a slot of the broadcast or multicast transmissions. In some examples, the base station TB component 1220 may scale the number of RBs within the slot based on the numerology. In some examples, the base station TB component 1220 may determine the TBS based on the scaled number of RBs within the slot. In some examples, the base station TB component 1220 may identify, based on the numerology, a reference number of spatial layers. In some examples, the base station TB component 1220 may determine the TBS based on the reference number of spatial layers. In some examples, the base station TB component 1220 may identify, based on the numerology, that multiple TBs are to be mapped to a single slot of the broadcast or multicast transmissions. In some examples, the base station TB component 1220 may determine an initial TBS based on a number of RBs within a slot of the broadcast or multicast transmissions. In some examples, the base station TB component 1220 may scale the initial TBS using a scaling factor based on the numerology. In some examples, the base station TB component 1220 may determine the TBS from a set of available TBSs based on the scaled initial TBS. For instance, the base station TB component 1220 may select an available TBS among the set of available TBSs. In some examples, the determined TBS may be a closest TBS to the scaled initial TBS in the set of available TBSs.

The base station communication component 1225 may communicate via the broadcast or multicast transmissions in accordance with at least one of the TBS and the number of TBs.

The MCS indication transmitter 1230 may transmit, to the UE, an indication of one of a set of MCS tables based on the numerology.

The base station capability information 1235 may receive, from the UE, UE capability information pertaining to scaling values supportable by the UE associated with RS patterns available to be signaled for use with the broadcast or multicast transmissions. In some examples, the base station capability information 1235 may transmit a MBMS from the base station, where the MBMS includes one of the RS patterns available to be signaled. In some examples, the base station capability information 1235 may receive the UE capability information with a MBMS interest indication.

The base station PMCH mapper 1240 may map the broadcast or multicast transmissions to a PMCH according to a numerology-specific mapping. In some examples, the base station PMCH mapper 1240 may map first to a VRB. In some examples, the base station PMCH mapper 1240 may map from the VRB to a PRB, where the mapping from the VRB to the PRB is numerology-specific. In some cases, the numerology-specific mapping includes a symbol-level interleaving of the broadcast or multicast transmissions. In some cases, the numerology-specific mapping is based on at least one of the TBS, the MCS, a bandwidth to be used for the broadcast or multicast transmissions, a number of codeblocks to be included in the broadcast or multicast transmissions, or a combination thereof.

The base station PMCH periodicity component 1245 may transmit an indication specifying a periodicity of a PMCH to be used for the broadcast or multicast transmissions. In some cases, the indication specifies the periodicity in terms of a number of slots.

Figure 13:
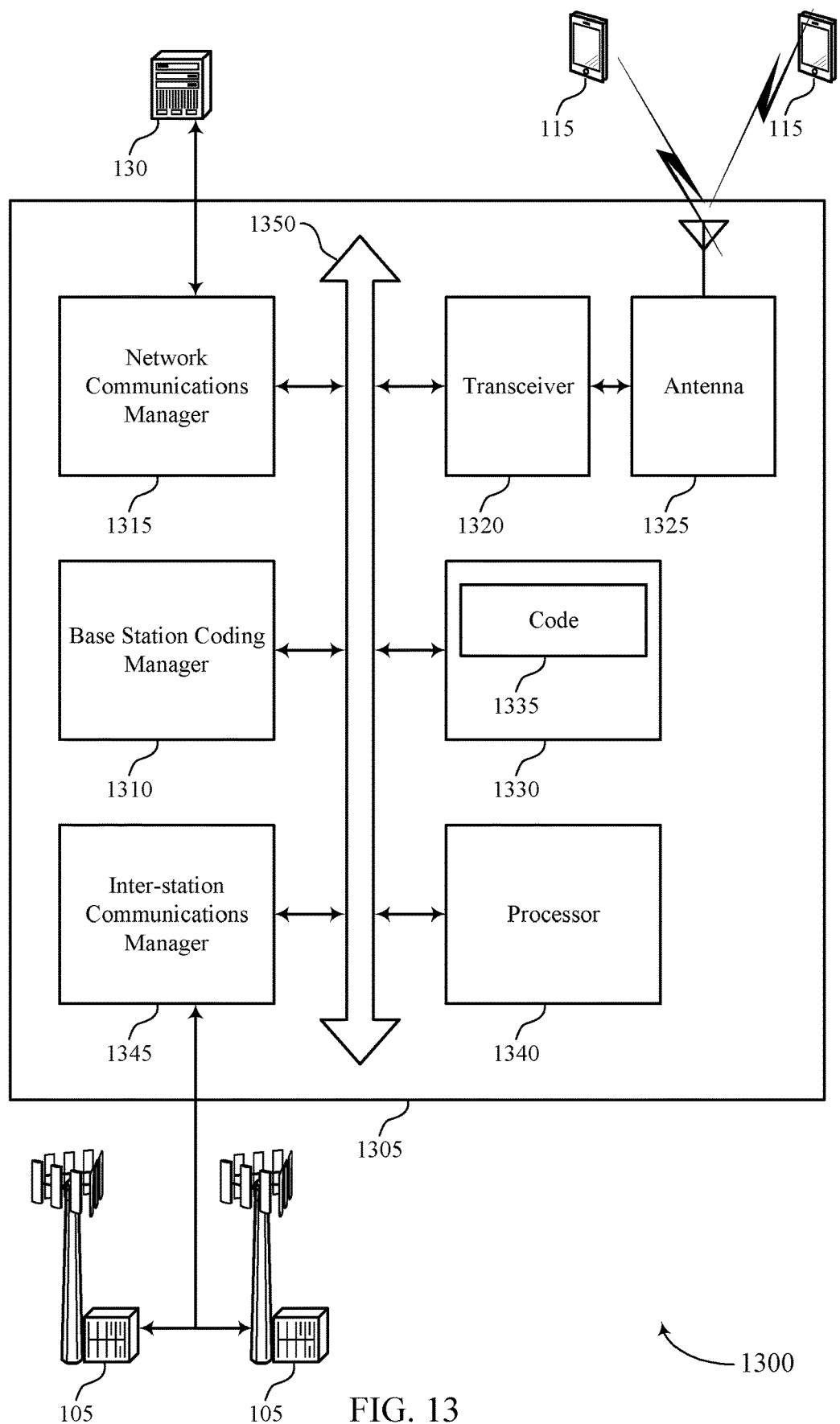
FIG. 13 shows a diagram of a system including a device that supports MBMS with new numerologies and RS patterns in accordance with aspects of the present disclosure.

FIG. 13 shows a diagram of a system 1300 including a device 1305 that supports MBMS with new numerologies and RS patterns in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit, to a UE, broadcast information indicating one or more of a numerology or a RS pattern to be used in broadcast or multicast transmissions, identify an MCS associated with the broadcast or multicast transmissions, determine one or more of a TBS or a number of TBs based at least on the MCS and at least one of the numerology or the RS pattern, and communicate via the broadcast or multicast transmissions in accordance with at least one of the TBS and the number of TBs.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting MBMS with new numerologies and RS patterns).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
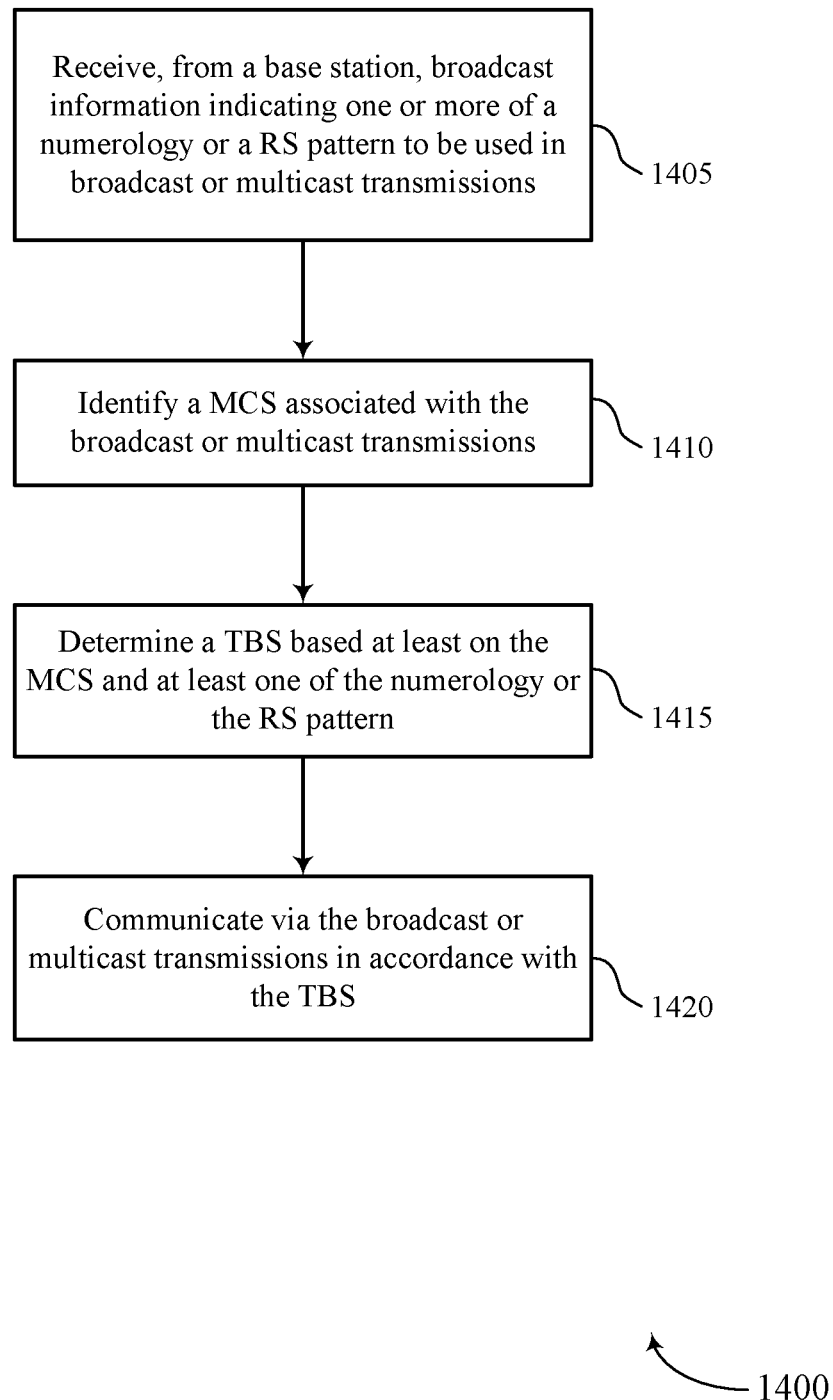
FIGS. 14 through 21 show flowcharts illustrating methods that support MBMS with new numerologies and RS patterns in accordance with aspects of the present disclosure.

FIG. 14 shows a flowchart illustrating a method 1400 that supports MBMS with new numerologies and RS patterns in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, broadcast information indicating one or more of a numerology or a RS pattern to be used in broadcast or multicast transmissions. The operations of 1405 may be performed according to the methods described herein. In some examples, aspects of the operations of 1405 may be performed by a broadcast information receiver as described with reference to FIGS. 6 through 9.

At 1410, the UE may identify an MCS associated with the broadcast or multicast transmissions. The operations of 1410 may be performed according to the methods described herein. In some examples, aspects of the operations of 1410 may be performed by a UE MCS identifier as described with reference to FIGS. 6 through 9.

At 1415, the UE may determine a TBS based at least on the MCS and at least one of the numerology or the RS pattern. The operations of 1415 may be performed according to the methods described herein. In some examples, aspects of the operations of 1415 may be performed by a UE TB component as described with reference to FIGS. 6 through 9.

At 1420, the UE may communicate via the broadcast or multicast transmissions in accordance with the TBS. The operations of 1420 may be performed according to the methods described herein. In some examples, aspects of the operations of 1420 may be performed by a UE communication component as described with reference to FIGS. 6 through 9.

Figure 15:
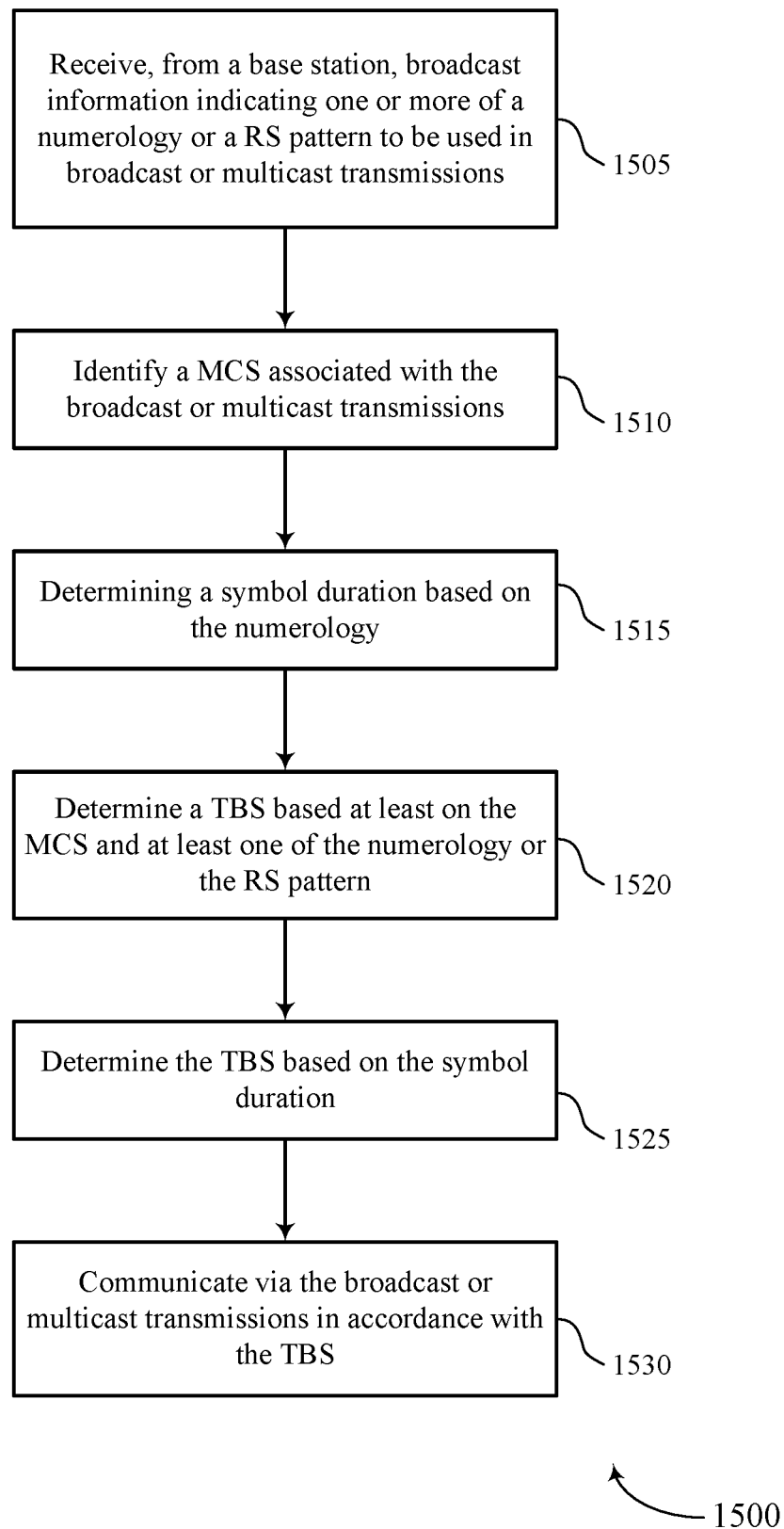

FIG. 15 shows a flowchart illustrating a method 1500 that supports MBMS with new numerologies and RS patterns in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, broadcast information indicating one or more of a numerology or a RS pattern to be used in broadcast or multicast transmissions. The operations of 1505 may be performed according to the methods described herein. In some examples, aspects of the operations of 1505 may be performed by a broadcast information receiver as described with reference to FIGS. 6 through 9.

At 1510, the UE may identify an MCS associated with the broadcast or multicast transmissions. The operations of 1510 may be performed according to the methods described herein. In some examples, aspects of the operations of 1510 may be performed by a UE MCS identifier as described with reference to FIGS. 6 through 9.

At 1515, the UE may determine a symbol duration based on the numerology. The operations of 1515 may be performed according to the methods described herein. In some examples, aspects of the operations of 1515 may be performed by a UE TB component as described with reference to FIGS. 6 through 9.

At 1520, the UE may determine a TBS based at least on the MCS and at least one of the numerology or the RS pattern. The operations of 1520 may be performed according to the methods described herein. In some examples, aspects of the operations of 1520 may be performed by a UE TB component as described with reference to FIGS. 6 through 9.

At 1525, the UE may determine the TBS based on the symbol duration. The operations of 1525 may be performed according to the methods described herein. In some examples, aspects of the operations of 1525 may be performed by a UE TB component as described with reference to FIGS. 6 through 9.

At 1530, the UE may communicate via the broadcast or multicast transmissions in accordance with the TBS. The operations of 1530 may be performed according to the methods described herein. In some examples, aspects of the operations of 1530 may be performed by a UE communication component as described with reference to FIGS. 6 through 9.

Figure 16:
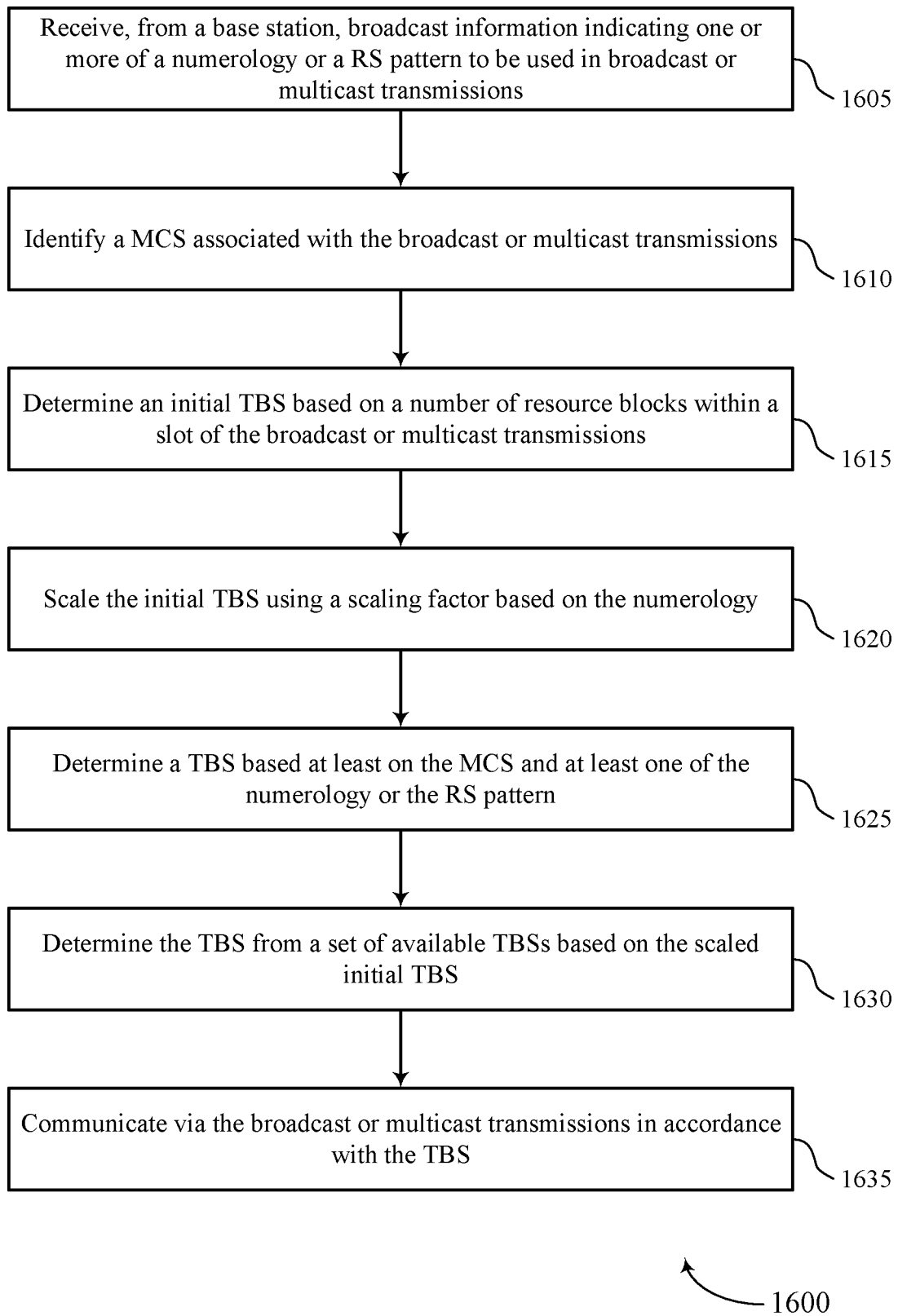

FIG. 16 shows a flowchart illustrating a method 1600 that supports MBMS with new numerologies and RS patterns in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, broadcast information indicating one or more of a numerology or a RS pattern to be used in broadcast or multicast transmissions. The operations of 1605 may be performed according to the methods described herein. In some examples, aspects of the operations of 1605 may be performed by a broadcast information receiver as described with reference to FIGS. 6 through 9.

At 1610, the UE may identify an MCS associated with the broadcast or multicast transmissions. The operations of 1610 may be performed according to the methods described herein. In some examples, aspects of the operations of 1610 may be performed by a UE MCS identifier as described with reference to FIGS. 6 through 9.

At 1615, the UE may determine an initial TBS based on a number of RBs within a slot of the broadcast or multicast transmissions. The operations of 1615 may be performed according to the methods described herein. In some examples, aspects of the operations of 1615 may be performed by a UE TB component as described with reference to FIGS. 6 through 9.

At 1620, the UE may scale the initial TBS using a scaling factor based on the numerology. The operations of 1620 may be performed according to the methods described herein. In some examples, aspects of the operations of 1620 may be performed by a UE TB component as described with reference to FIGS. 6 through 9.

At 1625, the UE may determine a TBS based at least on the MCS and at least one of the numerology or the RS pattern. The operations of 1625 may be performed according to the methods described herein. In some examples, aspects of the operations of 1625 may be performed by a UE TB component as described with reference to FIGS. 6 through 9.

At 1630, the UE may determine the TBS from a set of available TBSs based on the scaled initial TBS. For example, the comparison may include selecting an available TBS among the set of available TBSs that may be closest TBS to the scaled TBS. In some examples, the determined TBS may be a closest TBS to the scaled initial TBS in the set of available TBSs. The operations of 1630 may be performed according to the methods described herein. In some examples, aspects of the operations of 1630 may be performed by a UE TB component as described with reference to FIGS. 6 through 9.

At 1635, the UE may communicate via the broadcast or multicast transmissions in accordance with the TBS. The operations of 1635 may be performed according to the methods described herein. In some examples, aspects of the operations of 1635 may be performed by a UE communication component as described with reference to FIGS. 6 through 9.

Figure 17:
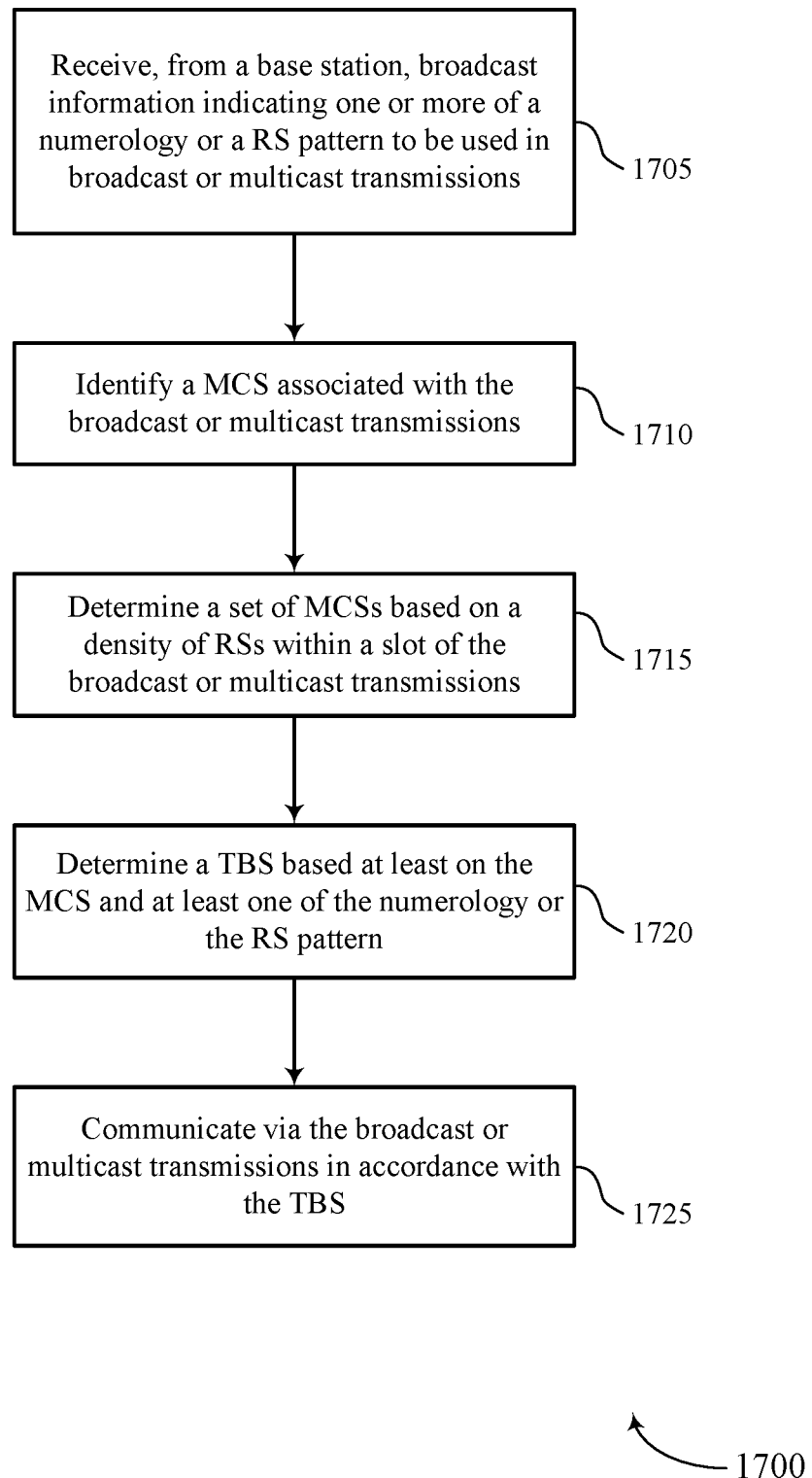

FIG. 17 shows a flowchart illustrating a method 1700 that supports MBMS with new numerologies and RS patterns in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, broadcast information indicating one or more of a numerology or a RS pattern to be used in broadcast or multicast transmissions. The operations of 1705 may be performed according to the methods described herein. In some examples, aspects of the operations of 1705 may be performed by a broadcast information receiver as described with reference to FIGS. 6 through 9.

At 1710, the UE may identify an MCS associated with the broadcast or multicast transmissions. The operations of 1710 may be performed according to the methods described herein. In some examples, aspects of the operations of 1710 may be performed by a UE MCS identifier as described with reference to FIGS. 6 through 9.

At 1715, the UE may determine a set of MCSs based on a density of RSs within a slot of the broadcast or multicast transmissions. The operations of 1715 may be performed according to the methods described herein. In some examples, aspects of the operations of 1715 may be performed by a UE MCS identifier as described with reference to FIGS. 6 through 9.

At 1720, the UE may determine a TBS based at least on the MCS and at least one of the numerology or the RS pattern. The operations of 1720 may be performed according to the methods described herein. In some examples, aspects of the operations of 1720 may be performed by a UE TB component as described with reference to FIGS. 6 through 9.

At 1725, the UE may communicate via the broadcast or multicast transmissions in accordance with the TBS. The operations of 1725 may be performed according to the methods described herein. In some examples, aspects of the operations of 1725 may be performed by a UE communication component as described with reference to FIGS. 6 through 9.

Figure 18:
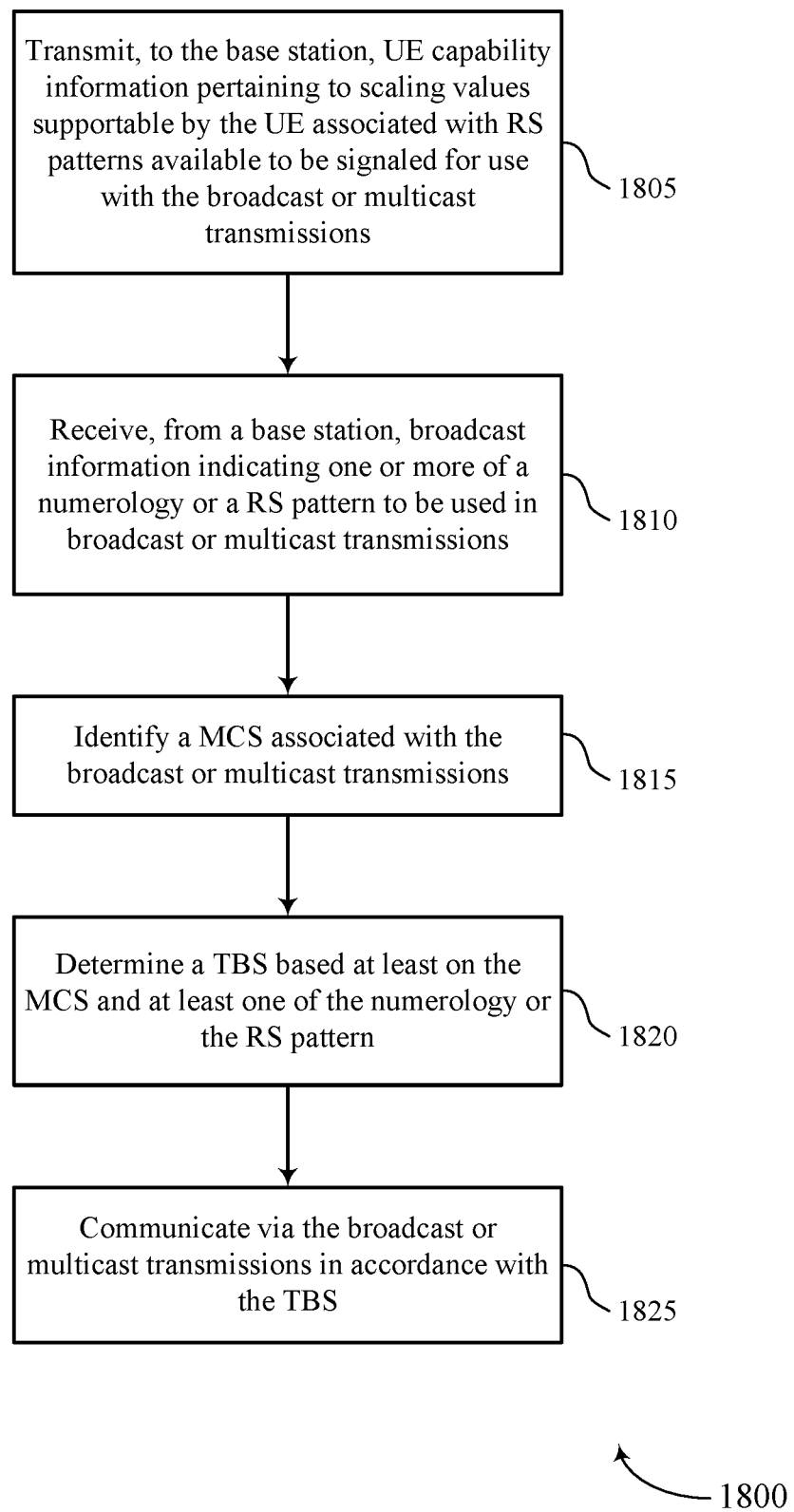

FIG. 18 shows a flowchart illustrating a method 1800 that supports MBMS with new numerologies and RS patterns in accordance with aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may transmit, to the base station, UE capability information pertaining to scaling values supportable by the UE associated with RS patterns available to be signaled for use with the broadcast or multicast transmissions. The operations of 1805 may be performed according to the methods described herein. In some examples, aspects of the operations of 1805 may be performed by a UE capability component as described with reference to FIGS. 6 through 9.

At 1810, the UE may receive, from a base station, broadcast information indicating one or more of a numerology or a RS pattern to be used in broadcast or multicast transmissions. The operations of 1810 may be performed according to the methods described herein. In some examples, aspects of the operations of 1810 may be performed by a broadcast information receiver as described with reference to FIGS. 6 through 9.

At 1815, the UE may identify an MCS associated with the broadcast or multicast transmissions. The operations of 1815 may be performed according to the methods described herein. In some examples, aspects of the operations of 1815 may be performed by a UE MCS identifier as described with reference to FIGS. 6 through 9.

At 1820, the UE may determine a TBS based at least on the MCS and at least one of the numerology or the RS pattern. The operations of 1820 may be performed according to the methods described herein. In some examples, aspects of the operations of 1820 may be performed by a UE TB component as described with reference to FIGS. 6 through 9.

At 1825, the UE may communicate via the broadcast or multicast transmissions in accordance with the TBS. The operations of 1825 may be performed according to the methods described herein. In some examples, aspects of the operations of 1825 may be performed by a UE communication component as described with reference to FIGS. 6 through 9.

Figure 19:
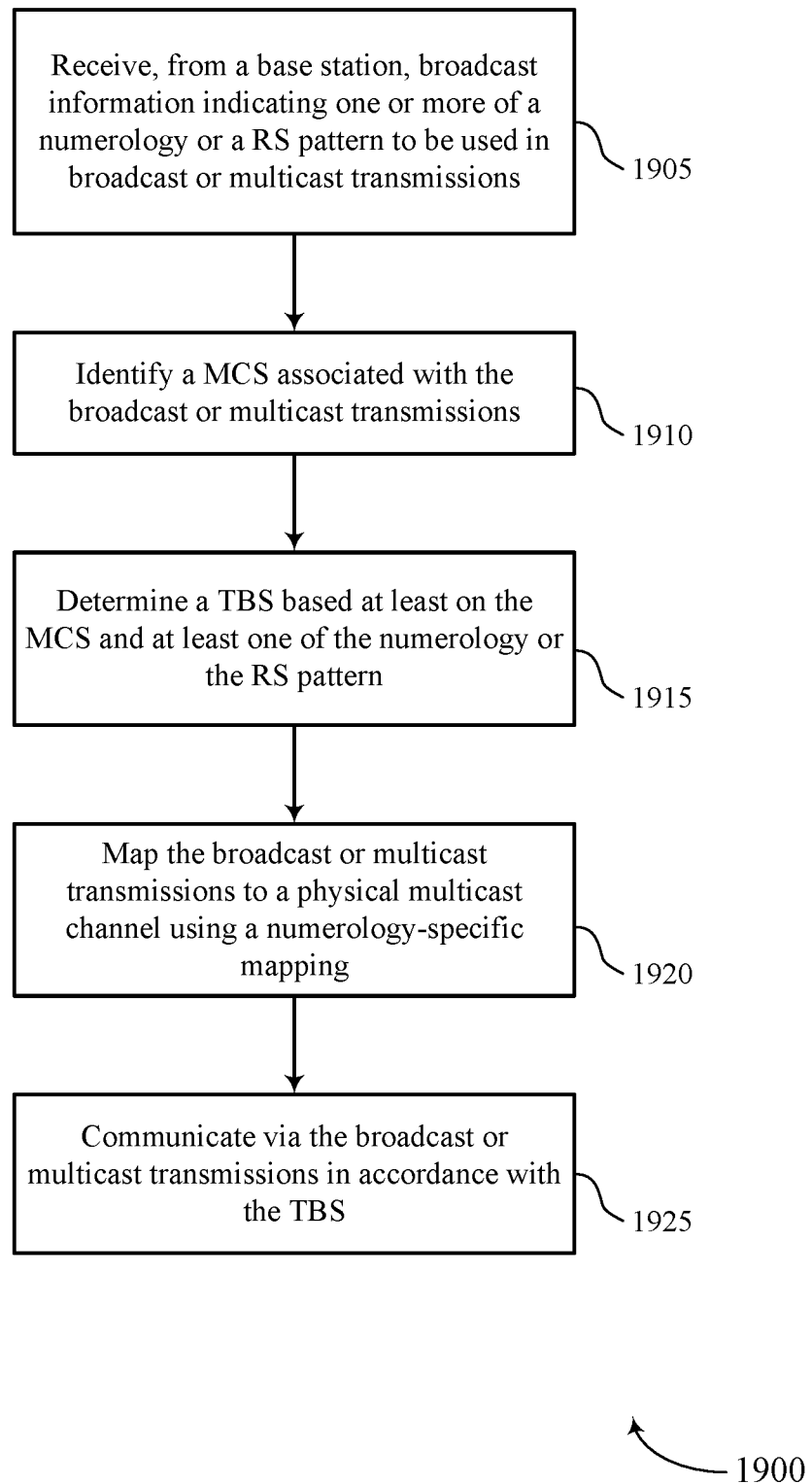

FIG. 19 shows a flowchart illustrating a method 1900 that supports MBMS with new numerologies and RS patterns in accordance with aspects of the present disclosure. The operations of method 1900 may be implemented by a UE 115 or its components as described herein. For example, the operations of method 1900 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, broadcast information indicating one or more of a numerology or a RS pattern to be used in broadcast or multicast transmissions. The operations of 1905 may be performed according to the methods described herein. In some examples, aspects of the operations of 1905 may be performed by a broadcast information receiver as described with reference to FIGS. 6 through 9.

At 1910, the UE may identify an MCS associated with the broadcast or multicast transmissions. The operations of 1910 may be performed according to the methods described herein. In some examples, aspects of the operations of 1910 may be performed by a UE MCS identifier as described with reference to FIGS. 6 through 9.

At 1915, the UE may determine a TBS based at least on the MCS and at least one of the numerology or the RS pattern. The operations of 1915 may be performed according to the methods described herein. In some examples, aspects of the operations of 1915 may be performed by a UE TB component as described with reference to FIGS. 6 through 9.

At 1920, the UE may map the broadcast or multicast transmissions to a PMCH using a numerology-specific mapping. The operations of 1920 may be performed according to the methods described herein. In some examples, aspects of the operations of 1920 may be performed by a UE PMCH mapper as described with reference to FIGS. 6 through 9.

At 1925, the UE may communicate via the broadcast or multicast transmissions in accordance with the TBS. The operations of 1925 may be performed according to the methods described herein. In some examples, aspects of the operations of 1925 may be performed by a UE communication component as described with reference to FIGS. 6 through 9.

Figure 20:
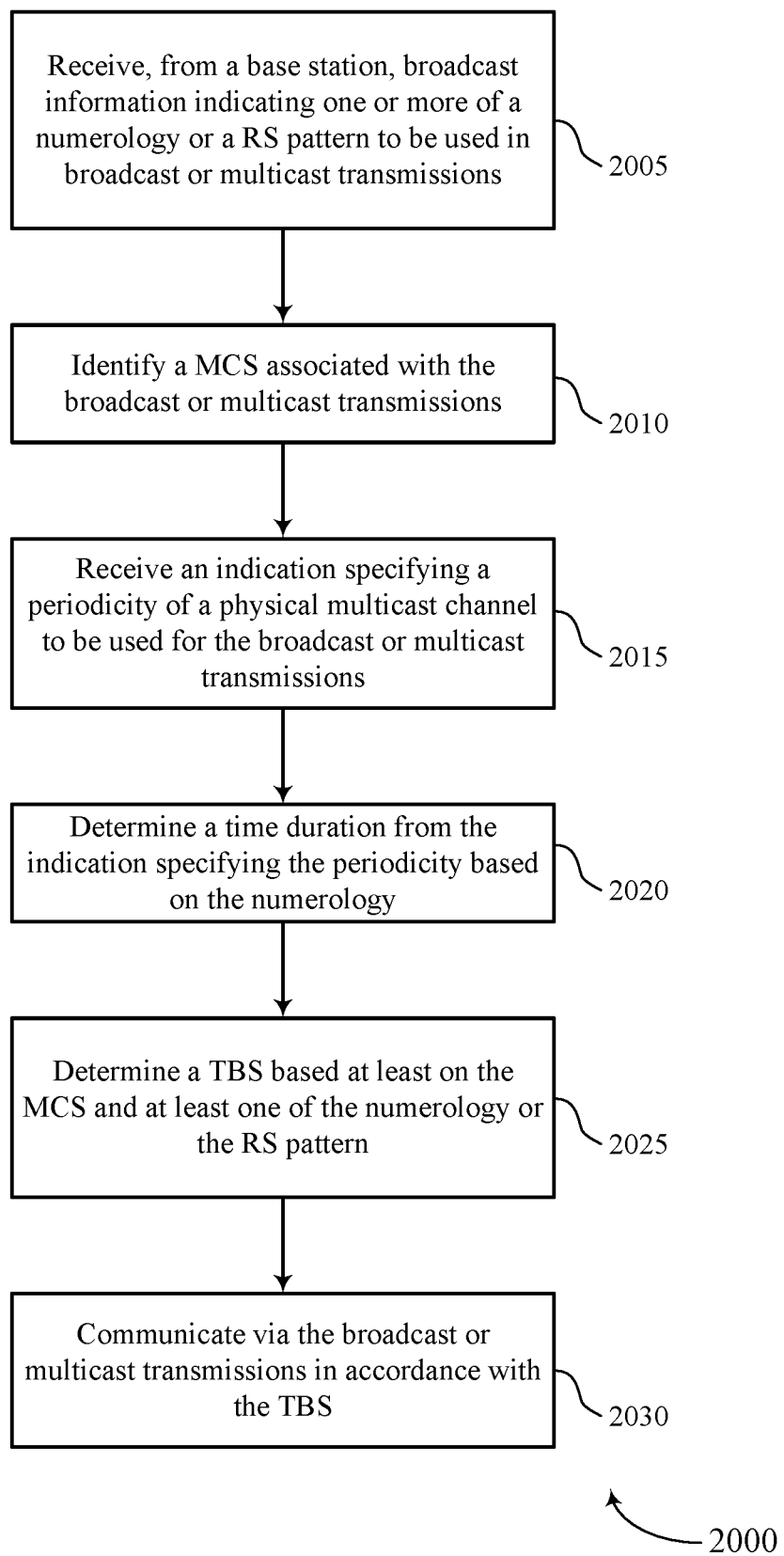

FIG. 20 shows a flowchart illustrating a method 2000 that supports MBMS with new numerologies and RS patterns in accordance with aspects of the present disclosure. The operations of method 2000 may be implemented by a UE 115 or its components as described herein. For example, the operations of method 2000 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, broadcast information indicating one or more of a numerology or a RS pattern to be used in broadcast or multicast transmissions. The operations of 2005 may be performed according to the methods described herein. In some examples, aspects of the operations of 2005 may be performed by a broadcast information receiver as described with reference to FIGS. 6 through 9.

At 2010, the UE may identify an MCS associated with the broadcast or multicast transmissions. The operations of 2010 may be performed according to the methods described herein. In some examples, aspects of the operations of 2010 may be performed by a UE MCS identifier as described with reference to FIGS. 6 through 9.

At 2015, the UE may receive an indication specifying a periodicity of a PMCH to be used for the broadcast or multicast transmissions. The operations of 2015 may be performed according to the methods described herein. In some examples, aspects of the operations of 2015 may be performed by a UE PMCH periodicity component as described with reference to FIGS. 6 through 9.

At 2020, the UE may determine a time duration from the indication specifying the periodicity based on the numerology. The operations of 2020 may be performed according to the methods described herein. In some examples, aspects of the operations of 2020 may be performed by a UE PMCH periodicity component as described with reference to FIGS. 6 through 9.

At 2025, the UE may determine a TBS based at least on the MCS and at least one of the numerology or the RS pattern. The operations of 2025 may be performed according to the methods described herein. In some examples, aspects of the operations of 2025 may be performed by a UE TB component as described with reference to FIGS. 6 through 9.

At 2030, the UE may communicate via the broadcast or multicast transmissions in accordance with the TBS. The operations of 2030 may be performed according to the methods described herein. In some examples, aspects of the operations of 2030 may be performed by a UE communication component as described with reference to FIGS. 6 through 9.

Figure 21:
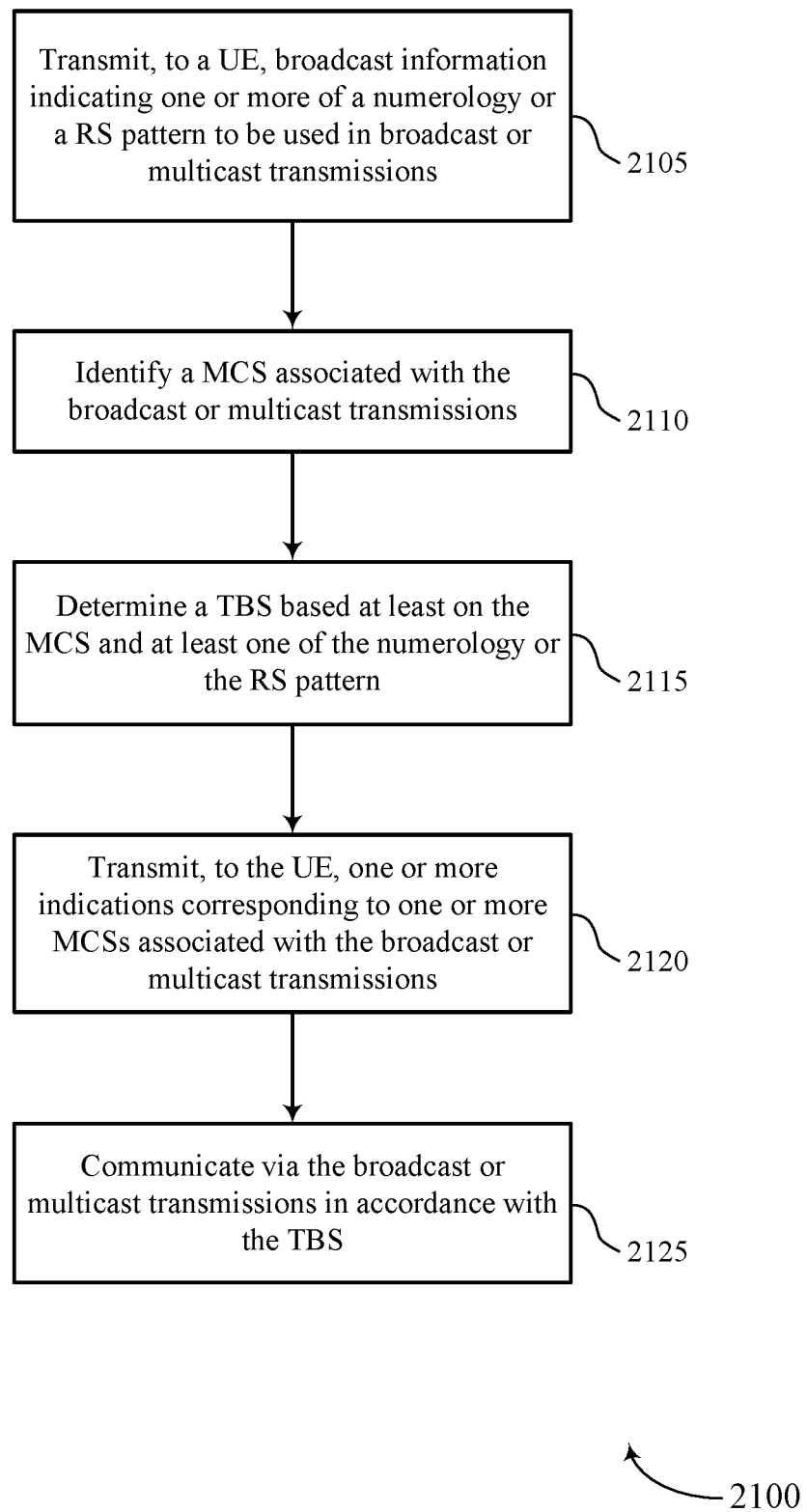

FIG. 21 shows a flowchart illustrating a method 2100 that supports MBMS with new numerologies and RS patterns in accordance with aspects of the present disclosure. The operations of method 2100 may be implemented by a base station 105 or its components as described herein. For example, the operations of method 2100 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, broadcast information indicating one or more of a numerology or a RS pattern to be used in broadcast or multicast transmissions. The operations of 2105 may be performed according to the methods described herein. In some examples, aspects of the operations of 2105 may be performed by a broadcast information transmitter as described with reference to FIGS. 10 through 13.

At 2110, the base station may identify an MCS associated with the broadcast or multicast transmissions. The operations of 2110 may be performed according to the methods described herein. In some examples, aspects of the operations of 2110 may be performed by a base station MCS identifier as described with reference to FIGS. 10 through 13.

At 2115, the base station may determine a TBS based at least on the MCS and at least one of the numerology or the RS pattern. The operations of 2115 may be performed according to the methods described herein. In some examples, aspects of the operations of 2115 may be performed by a base station TB component as described with reference to FIGS. 10 through 13.

At 2120, the base station may transmit, to the UE, one or more indications corresponding to one or more MCSs associated with the broadcast or multicast transmissions. The operations of 2120 may be performed according to the methods described herein. In some examples, aspects of the operations of 2120 may be performed by a broadcast information transmitter as described with reference to FIGS. 10 through 13.

At 2125, the base station may communicate via the broadcast or multicast transmissions in accordance with the TBS. The operations of 2125 may be performed according to the methods described herein. In some examples, aspects of the operations of 2125 may be performed by a base station communication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   one or more processors; and
   one or more memories coupled with the one or more processors and storing instructions executable by the one or more processors to cause the apparatus to:
      receive, system information indicating a numerology, a reference signal (RS) pattern, and a modulation and coding scheme (MCS) associated with a broadcast or multicast service;
      determine an initial transport block size (TBS) based at least in part on the numerology, the RS pattern, and the MCS;
      scale the initial TBS using a scaling factor based at least in part on the numerology indicating that an orthogonal frequency division multiplexing (OFDM) symbol associated with the broadcast or multicast service spans multiple subframes;
      select, based at least in part on the scaled initial TBS, a TBS from a set of TBSs; and
      receive the broadcast or multicast service via a multicast channel in accordance with the TBS.

2. The apparatus of claim 1, wherein the TBS is a closest valid TBS to the scaled initial TBS in the set of TBSs.

3. The apparatus of claim 1, wherein the initial TBS is further based at least in part on a quantity of physical resource blocks.

4. The apparatus of claim 1, wherein the numerology and the RS pattern are associated with a multicast-broadcast single frequency network (MBSFN) area.

5. The apparatus of claim 1, wherein the multicast channel is a physical multicast channel, wherein the physical multicast channel is associated with the numerology, and wherein scaling the initial TBS using the scaling factor is based at least in part on the physical multicast channel being associated with the numerology.

6. The apparatus of claim 1, wherein the instructions to determine the initial TBS are further executable by the one or more processors to cause the apparatus to:
   identify, based at least in part on the numerology, a reference number of spatial layers; and
   determine the initial TBS based at least in part on the reference number of spatial layers.

7. The apparatus of claim 1, wherein the instructions are further executable by the one or more processors to cause the apparatus to:
   receive an indication specifying a periodicity of the multicast channel to be used for the broadcast or multicast service; and
   determine an OFDM symbol duration from the indication specifying the periodicity based at least in part on the numerology.

8. The apparatus of claim 1, wherein each subframe of the multiple subframes has a duration of 1 millisecond.

9. The apparatus of claim 1, wherein the UE uses a first MCS table associated with the multicast channel, from a plurality of MCS tables comprising the first MCS table associated with the multicast channel and a second MCS table associated with a downlink shared channel, to determine the initial TBS based at least in part on the numerology and the RS pattern.

10. An apparatus for wireless communications at a network node, comprising:
    one or more processors; and
    one or more memories coupled with the one or more processors and storing instructions executable by the one or more processors to cause the apparatus to:
       transmit system information indicating a numerology, a reference signal (RS) pattern, and a modulation and coding scheme (MCS) associated with a broadcast or multicast service;
       determine an initial transport block size (TBS) based at least in part on the numerology, the RS pattern, and the MCS;
       scale the initial TBS using a scaling factor based at least in part on the numerology indicating that an orthogonal frequency division multiplexing (OFDM) symbol associated with the broadcast or multicast service spans multiple subframes;
       select, based at least in part on the scaled initial TBS, a TBS from a set of TBSs; and
       transmit the broadcast or multicast service via a multicast channel in accordance with the TBS.

11. The apparatus of claim 10, wherein the TBS is a closest valid TBS to the scaled initial TBS in the set of TBSs.

12. The apparatus of claim 10, wherein the initial TBS is further based at least in part on a quantity of physical resource blocks.

13. The apparatus of claim 10, wherein the numerology and the RS pattern are associated with a multicast-broadcast single frequency network (MBSFN) area.

14. The apparatus of claim 10, wherein the multicast channel is a physical multicast channel, wherein the physical multicast channel is associated with the numerology, and wherein scaling the initial TBS using the scaling factor is based at least in part on the physical multicast channel being associated with the numerology.

15. The apparatus of claim 10, wherein the instructions to determine the initial TBS are further executable by the one or more processors to cause the apparatus to:
    identify, based at least in part on the numerology, a reference number of spatial layers; and
    determine the initial TBS based at least in part on the reference number of spatial layers.

16. The apparatus of claim 10, wherein the instructions are further executable by the one or more processors to cause the apparatus to:
    transmit an indication specifying a periodicity of the multicast channel to be used for the broadcast or multicast service; and
    determine an OFDM symbol duration from the indication specifying the periodicity based at least in part on the numerology.

17. The apparatus of claim 10, wherein each subframe of the multiple subframes has a duration of 1 millisecond.

18. The apparatus of claim 10, wherein the network node uses a first MCS table associated with the multicast channel, from a plurality of MCS tables comprising the first MCS table associated with the multicast channel and a second MCS table associated with a downlink shared channel, to determine the initial TBS based at least in part on the numerology and the RS pattern.

19. A method for wireless communications at a user equipment (UE), comprising:

receiving system information indicating a numerology, a reference signal (RS) pattern, and a modulation and coding scheme (MCS) associated with a broadcast or multicast service;

determining an initial transport block size (TBS) based at least in part on the numerology, the RS pattern, and the MCS;

scaling the initial TBS using a scaling factor based at least in part on the numerology indicating that an orthogonal frequency division multiplexing (OFDM) symbol associated with the broadcast or multicast service spans multiple subframes;

selecting, based at least in part on the scaled initial TBS, a TBS from a set of TBSs; and receiving the broadcast or multicast service via a multicast channel in accordance with the TBS.

20. The method of claim 19, wherein the TBS is a closest valid TBS to the scaled initial TBS in the set of TBSs.

21. The method of claim 19, wherein the initial TBS is further based at least in part on a quantity of physical resource blocks.

22. The method of claim 19, wherein the numerology and the RS pattern are associated with a multicast-broadcast single frequency network (MBSFN) area.

23. The method of claim 19, wherein the multicast channel is a physical multicast channel, wherein the physical multicast channel is associated with the numerology, and wherein scaling the initial TBS using the scaling factor is based at least in part on the physical multicast channel being associated with the numerology.

24. The method of claim 19, wherein determining the initial TBS comprises:

identifying, based at least in part on the numerology, a reference number of spatial layers; and determining the initial TBS based at least in part on the reference number of spatial layers.

25. The method of claim 19, further comprising:

receiving an indication specifying a periodicity of the multicast channel to be used for the broadcast or multicast service; and determining an OFDM symbol duration from the indication specifying the periodicity based at least in part on the numerology.

26. A method for wireless communications at a network device, comprising:

transmitting, to system information indicating a numerology, a reference signal (RS) pattern, and a modulation and coding scheme (MCS) associated with a broadcast or multicast service;

determining an initial transport block size (TBS) based at least in part on the numerology, the RS pattern, and the MCS;

scaling the initial TBS using a scaling factor based at least in part on the numerology indicating that an orthogonal frequency division multiplexing (OFDM) symbol associated with the broadcast or multicast service spans multiple subframes;

selecting, based at least in part on the scaled initial TBS, a TBS from a set of TBSs; and transmitting the broadcast or multicast service via a multicast channel in accordance with the TBS.

27. The method of claim 26, wherein the TBS is a closest valid TBS to the scaled initial TBS in the set of TBSs.

28. The method of claim 26, wherein the initial TBS is further based at least in part on a quantity of physical resource blocks.

29. The method of claim 26, wherein the numerology and the RS pattern are associated with a multicast-broadcast single frequency network (MBSFN) area.

30. The method of claim 26, wherein the multicast channel is a physical multicast channel, wherein the physical multicast channel is associated with the numerology, and wherein scaling the initial TBS using the scaling factor is based at least in part on the physical multicast channel being associated with the numerology.

* * * * *